United States Patent [19]

Glass, Jr.

[11] Patent Number: 4,561,985

[45] Date of Patent: Dec. 31, 1985

[54] HEC-BENTONITE COMPATIBLE BLENDS

[75] Inventor: Joseph E. Glass, Jr., Fargo, N. Dak.

[73] Assignee: Union Carbide Corporation, Danbury, Conn.

[21] Appl. No.: 392,712

[22] Filed: Jun. 28, 1982

[51] Int. Cl.$^4$ .............................................. C09K 7/00
[52] U.S. Cl. .............................. 252/8.5 A; 252/8.5 C
[58] Field of Search ........................... 252/8.5 A, 8.5 C

[56] References Cited

U.S. PATENT DOCUMENTS

| | | | |
|---|---|---|---|
| 2,589,949 | 3/1952 | Meadors | 252/8.5 |
| 2,599,342 | 6/1952 | Meadors | 252/8.5 C |
| 2,786,027 | 3/1957 | Salathiel | 252/8.5 C |
| 2,854,407 | 9/1958 | Mallory | 252/8.5 C |
| 3,070,543 | 12/1962 | Scott, Jr. | 252/8.5 |
| 3,198,268 | 8/1965 | Lindblom | 252/8.5 C |
| 3,200,106 | 8/1965 | Dickson et al. | 252/8.5 C X |
| 3,360,461 | 12/1967 | Anderson et al. | 252/8.5 |
| 3,472,325 | 10/1969 | Lummus | 252/8.5 |
| 3,525,688 | 8/1970 | Swanson | 252/8.5 |
| 3,558,545 | 1/1971 | Lummus | 252/8.5 A |
| 3,687,846 | 8/1972 | Lang | 252/8.5 C X |
| 3,844,361 | 10/1974 | Jackson | 175/66 |
| 3,852,201 | 12/1974 | Jackson | 252/8.5 |
| 3,953,336 | 4/1976 | Daigle | 252/8.5 |
| 3,953,337 | 4/1976 | Walker et al. | 252/8.5 A |
| 3,988,246 | 10/1976 | Hartfiel | 252/8.5 |
| 4,087,365 | 5/1978 | Clem | 252/8.5 A |
| 4,425,241 | 1/1984 | Swanson | 252/8.5 A |
| 4,427,556 | 1/1984 | House et al. | 252/8.5 C X |

FOREIGN PATENT DOCUMENTS 2826070 2/1979 Fed. Rep. of Germany ... 252/8.5 C

Primary Examiner—John F. Terapane
Assistant Examiner—Virginia B. Caress
Attorney, Agent, or Firm—Henry H. Gibson

[57] ABSTRACT

Drilling fluids, both fresh and saline, containing additives and compositions, predominantly nonionic in nature, for the beneficiation of bentonite in such drilling slurries are described. The primary class of compounds employed are ethylene oxide derivatives, nonionic polysaccharides and under certain specified conditions anionic polysaccharides. In fresh water slurries polyethylene glycol derivatives of significantly different molecular weights are employed with nonionic polysaccharides for optimizing the rheological characteristics of bentonite slurries. The anionic polysaccharide can be deleted from the blend for economic reasons. In such formulations (i.e., a polyethylene glycol-nonionic polysaccharide blend) the molecular weight of the polyethylene glycol is important in obtaining low shear-rate yield stress characteristics in fresh water slurries, at elevated temperatures for maximum drill solids carrying capacity within the wellbore. The blend of beneficiating agents affects a decreasing yield stress character with decreasing temperature to permit drill solids removal at ambient surface conditions. In saline solutions polyethylene glycols of intermediate molecular weight (less than 30,000) and nonionic polysaccharides are effective in inhibiting syneresis (i.e., phase separation) and in providing good slurry rheological profiles at elevated temperatures. Anionic polysacchrides are utilized (particularly in saline solutions) to ensure the proper structuring of the bentonite wellbore filter cake for fluid loss control and to ensure optimum rheological characteristics of the slurry with the ternary blend of beneficiating agents at intermediate reservoir temperatures.

28 Claims, 14 Drawing Figures

HEC-BENTONITE COMPATIBLE BLENDS

BACKGROUND OF THE INVENTION

1. Field of the Invention

The invention relates to drilling fluids for forming oil, gas and water wells.

2. Description of the Prior Art

Drilling fluid or "mud" is a mixture of (refined) clays, usually bentonite, and water. Special chemicals are added to the drilling fluid to compensate for the varying composition of the water and the formation being drilled and to increase the weight of the column. The drilling fluid can contain a gel for its slip properties and/or any kind of conventional filler. The drilling fluid is used in oil, gas and water drilling to carry rock cuttings to the surface and to lubricate and cool the drilling bit. The drilling fluid, by hydrostatic pressure, helps prevent the collapse of unstable strata into the hole and the intrusion of water from water-bearing strata that may be encountered. The drilling fluid is used to increase or decrease pressure in the drill hole, to cool and lubricate the drill bit and other machinery and to coat delicate formation whose exposed surfaces in the drill hole (well bore) need protection.

The modern technique of drilling oil and gas wells is to drill using a rotary drill, i.e., turning steel knuckles or teeth (of tungsten), located on the drill pipe. Drilling fluid is a fluid that helps cool the drilling bit (or teeth) while transporting rock cuttings to the surface. The drilling fluid also serves to keep any oil or gas underground—the hydrocarbons in the rock strata are usually under pressure and tend to blow or spew out of the well hole.

With rotary drilling, the drill bit rotates while bearing down on the bottom of the well, thus gouging and chipping its way downward. When conducting rotary drilling, the well bore is kept full of liquid during drilling. A weighted fluid (called drilling fluid or mud) in the bore hole serves at least two important purposes: (a) by its hydrostatic pressure, it prevents the entry of formation fluids into the well thus preventing blowouts and gushers; and (b) the drilling fluid carries the crushed rock to the surface, so that the drilling is continuous until the bit wears out. The drill bit is connected to the surface equipment through a drill pipe, a heavy-walled tubing through which the drilling mud is fed to the bottom of the bore hole. In most cases, the drill pipe also transmits the rotary motion from a turntable at the surface to the drilling bit at the bottom of the hole. The top piece of the drill pipe is a tube of square or octagonal cross section called the kelly, which passes through a square or octagonal hole in the turntable (located near the bottom of the derrick). The drilling fluid leaves the drill pipe in such a way that it washes the loose rock from the bottom and carries it to the surface. The drilling bit has a number of jets through which the drilling fluid is forced by pressure into the bottom of the drill hole. Drilling fluid is carefully formulated to the correct weight and viscosity characteristics for its required tasks. After screening to remove the rock chips, the returning drilling fluid is usually held in open pits for recirculating through the well. The drilling fluid is picked up by piston pumps and forced through a swivel joint into the top of the drill pipe. When a worn drilling bit is being changed, the drilling fluid is left in the bore hold to prevent excessive flow of fluids into the well from the surrounding rock and sand.

Bentonite at a concentration of about 28.8 lbs/bbl of water (8.2 percent) provides a slurry with good rheological characteristics (i.e., high viscosities with yield stress behavior at low shear rates denoting solids carrying capacity away from the drill bit, and relatively low viscosities at high shear rates in the vicinity of the drill bit to minimize torque requirements). Bentonite in fresh water also forms an excellent filter cake on the wall of the wellbore and thus ensures low fluid loss in a formation of variable permeability. Bentonite drilling fluids of about 28 lbs/bbl concentrations are relatively high in total solids and density. These factors lead to a reduction in the rate at which a wellbore can be drilled to a given depth. Two other major disadvantages associated with high total solids bentonite drilling muds are the high cost of transportation and storage, which can be substantial for drilling sites located in distant and hostile environments, and in drilling formations with high shale contents. The shale is hydrated by the aqueous medium which results in fines, increasing the viscosity of the drilling fluid, and in sloughing from sites previously drilled. Shale hydration inhibitors such as calcium chloride cannot be used as they interact with bentonite particles, resulting in many detrimental changes (e.g., phase separation) to the mud.

In the formulating of drilling fluids, a clay such as bentonite is usually added to water to prepare an aqueous mud. In other cases drilled shales are allowed to accumulate in the mud as drilling progresses in order to build up properties such as weight, viscosity and gel strength. Sometimes muds with oil as the continuous phase are used to prevent hole problems, and in other cases flocculants are added to aqueous mud to aid in dropping cut solids at the surface. The result of using such a clay-based mud system has been a build-up of undesirable solids, either in the circulating mud or in the form of excess mud which is stored in reserve or disposal pits. This build-up, if not properly dealt with, will cause increases in unit weight (specific gravity), viscosity and gel strength to such high levels that a number of undesirable events may occur. The mud cake on the wellbore wall may become so thick that swabbing occurs in pulling the bit, causing sloughing or caving of the wall and further increases in viscosity and gel strength. Drilling rate may decrease because of the thick filter cake on bottom. The fluid may even become so thick as to be unpumpable. To try to avoid such problems, a close watch is kept on the circulating mud and rather expensive preventive steps taken. Flocculants are added in the settling pits in attempts to bring about agglomeration and settling of the hydrated and dispersed drilled solids, a step likely to remove some of the originally added bentonite as well. A fraction of the mud is discarded or laid aside, and the balance is thinned to the desired unit weight with water. In so thinning, the concentrations of some if not all constituents of the mud are reduced below the desired levels. In such case the only recourse available is to add more of the very materials just thrown out in the discarded fraction, primarily bentonite but also many of the other additives used for fluid lose control and various other properties.

The usual clay bentonite-type drilling mud systems have limitations that require the use of various drilling additivies to control flow properties when the fluid encounters conditions in drilling operations which might detrimentally alter mud properties. These changes result in lower drilling and penetration rates and delays in drilling operations, which, in turn, increase overall drilling costs. In many cases with conventional drilling fluids, such additives only create more problems. This is due to the fact that while serving to control a specific mud property the additive may produce additional undesirable effects on the mud system. Such may result from the additive being incompatible with other components in the system, or may be due to a direct effect on mud properties. Also, such drilling fluids are adversely affected when they become contaminated with calcium compounds, potassium or sodium chlorides, etc. Thus, with high salt or calcium contamination, the effect on yield point, gel strengths and fluid loss characteristics of such conventional muds renders the latter essentially useless unless special treatment procedures are employed. In the case of high salt contamination, bentonite muds are usually not run. Instead, salt gel or attapulgite is used as a viscosifier. Even in the case of a prehydrated bentonite which is suddenly contaminated with salt, serious detrimental effects on flow properties result. This is particularly true in the case of highly dispersed muds. For example, the plastic viscosity decreases, the fluid loss increases, and the gel strengths increase.

Water provides the fastest drilling rate of any liquid; however, such a fluid does not have the viscosity profile suitable for carrying drill solids to the surface from any significant depth. In addition, aqueous solutions readily hydrate the different types of shale in certain formations which can result in swelling and sloughing of the clay, leading to cave-in of the walls in previously drilled sections or balling near the drill bit. Use of various salt solutions can be employed in part to inhibit hydration of such shales. It is common in the art to employ water-soluble polymers (W-SPs) to thicken such solutions, in part, to retard migration of the salts into the formation and in part to synergistically improve stabilization of the shale. The water-soluble polymers also provide the viscosity necessary for lifting drilled solids from the wellbore. Such thickened fluids are known to provide extremely fast drilling rates. Shear stresses in the immediate vicinity of the drill bit are high ($\sim 10^5$ sec$^{-1}$). Under such shear stresses most water-soluble polymers are degraded, with a subsequent lowering of the solution viscosities.

Polymer beneficiation of bentonite can provide a compromise between the advantages and disadvantages associated with the two types of drilling fluids described above. Polymer beneficiation permits the use, generally, of one-half of the normal amount of bentonite required to reach a given viscosity and the lower density of such a fluid, in part, allows faster drilling rates. In addition bentonite of poorer quality can be used, after being beneficiated, to achieve a given viscosity. In beneficiating a clay the viscosifying power of the polymer becomes less shear sensitive (i.e., the drop in viscosity will be less per pass through the drill bit area).

U.S. Pat. No. 3,070,543 teaches that a vinyl acetate/maleic acid copolymer is effective in beneficiating bentonite and flocculating drill solids in fresh water slurries. U.S. Pat. Nos. 3,360,461, 3,472,325 and 3,558,545 disclose that the use of acrylamide/acrylic acid copolymers of intermediate hydrolysis or of low hydrolysis, blended with polyacrylic acid are more effective in beneficiating low solids bentonite muds than the maleic acid/vinyl acetate copolymer (MAVAC). In such disclosures the use of polyacid beneficiating agents are restricted in certain concentration ranges. Below a certain critical concentration the polymers are not effective and above a certain concentration the water-soluble polymers act as flocculants instead of beneficiating agents. These factors limit the ability of such beneficiating agents to increase the low shear viscosity of low-solid bentonite slurries which is needed for lifting drill solids from the formation. The employment of small amounts of the calcium salt of acrylic acid has been disclosed in U.S. Pat. No. 4,087,365 to resolve this deficiency in relatively fresh water slurries. Although a need for beneficiating agents that are effective in saline solutions is noted in U.S. Pat. No. 3,360,461, all of the patents cited above describe materials that are ineffective in dealing with the salinities (particularly the presence of divalent ions) encountered in many connate waters of subterranean formations. This is not surprising since the beneficiating agents described in the patents are synthetic polyacids, which are susceptible to adverse interactions with divalent ions.

The art has envisaged that bentonite slurries compatible with saline environments might be obtained if the beneficiating agents were nonionic, such as poly(ethylene oxide). Intermediate to high molecular weight poly(ethylene oxide) has been disclosed (U.S. Pat. No. 3,525,688) to be an effective fluid loss control agent for bentonite muds at high levels (i.e., 6 lbs/bbl), but also to adversely affect the rheological characteristics of such muds. Intermediate molecular weight polyethylene glycols have been employed to lower the viscosity (U.S. Pat. No. 2,589,949) of resurfaced bentonite muds. The use of high molecular weight poly(ethylene oxides) in combination with various types of polyacids have also been disclosed (U.S. Pat. No. 3,687,846) to enhance the properties of fresh-water bentonite slurries.

U.S. Pat. No. 3,953,336 teaches that Xanthomonas campestris polysaccharide (XCPS) proficiently disperses bentonite and other drilled solids. However, the XCPS is extremely susceptible to enzyme attack. The patent observes that the use of Xanthomonas compestris polysaccharide/hydroxyethyl cellullose in clay-free drilling fluids is observed to stabilize shale particularly in the presence of potassium chloride. The use of Xanthomonas compestris polysaccharide only with magnesium oxide is disclosed by U.S. Pat. No. 3,988,246 to be an effective drilling thickener; however, lignosulfonates have to be added to such formulations "to maintain good properties of the drilling mud" because solids removal is difficult without hydroxyethyl cellulose (see U.S. Pat. Nos. 3,844,361 and 3,852,201). The favorable aspects of hydroxyethyl cellulose in the stabilization of typical shale formations also is disclosed by Weiss (German Pat. No. 2,524,991).

BROAD DESCRIPTION OF THE INVENTION

An object of the invention is to provide a drilling fluid for oil wells and gas wells. Another object of this invention is to provide a drilling fluid having a high drilling rate, high viscosity, and a low fluid loss. A further object is to provide a drilling fluid with such properties in a saline well environment. Another object of the invention is to control the rheological properties of drilling fluids. Another object of the invention is to provide a process of preparing such drilling fluid. Another object of the invention is to provide a process for using such drilling fluid which permits high drilling rates, but which will effectively remove cuttings and prevent excessive loss of water to the formations being drilled.

Another object is to provide an improved method of drilling a well. Other objects and advantages of the invention are set out herein or are obvious herefrom to one ordinarily skilled in the art.

The objects and advantages of the invention are achieved by the drilling fluid and the processes of the invention.

The invention involves novel drilling fluids for the forming of oil wells, gas wells, water and geothermal wells and wellbores for various minerals. The drilling fluid of the invention includes (a) bentonitic clay or sub-bentonitic clay; (b) a nonionic, water-soluble polysaccharide or an anionic, water-soluble polysaccharide or a combination thereof; (c) an intermediate molecular weight polyglycol and (d) water. The polyglycol is used in an amount effective to provide compatability in the drilling fluid between the clay and the polysaccharide. The drilling fluid is very effective even in a highly saline environment, such as, a well being drilled on the continental shelf.

The key to the invention is the use of an intermediate molecular weight polyglycol, preferably intermediate molecular weight polyethylene glycol, in combination with a nonionic or anionic water-soluble polysaccharide, preferably hydroxyethyl cellulose, to beneficiate bentonite-water mixtures used in oil well drilling. Without the polyethylene glycol, the hydroxyethyl cellulose and bentonite are not compatible. The combination of the three reagents provides drilling fluids which are effective even in highly saline environments. Intermediate polyethylene glycol synergistically affects the rheological profiles of polysaccharide-beneficiated bentonite slurries. The preferred synergistic results are obtained when the polysaccharide is hydroxyethyl cellulose.

In a non-saline environment, the polysaccharide is preferably a nonionic water-soluble polysaccharide. Preferably the nonionic polysaccharide contains hydroxyalkyl groups, and preferably the hydroxyalkyl groups contain 1 to 4 carbon atoms. Hydroxyethyl cellulose is most preferred for non-saline environments.

The polysaccharide is preferably an anionic, water-soluble polysaccharide when the drilling is done in a saline environment. The preferred anionic, water-soluble polysaccharide is sodium carboxymethyl cellulose. Preferably the polyglycol is an intermediate molecular weight polyethylene glycol, most preferably with an average molecular weight of from about 600 to about 30,000. Additives such as a polyalkylene amine, a polyalkylene imine or an ethanolamine can be incorporated in the drilling fluid.

The drilling fluids of the invention have exellent rheological profiles for drilling at slow and fast rates and at even elevated temperatures. The drilling muds have suitable rheological characteristics including viscosity, yield point, initial gel strength and final gel strength in spite of adverse conditions encountered in well drilling. The invention allows control of the rheological properties of the drilling fluids. The drilling fluids have a viscosity which is low enough so that they can be readily pumped and yet high enough that they can suspend cuttings from the drilling operation therein and prevent their settling while the fluid is being passed from the drill hole. The drilling fluids perform the additional function of providing a filter cake on the walls of the bore hole to at least partially prevent the loss of fluid, particularly water, from the drilling fluid into any porous formations adjacent the bore hole.

The polysaccharides used in the invention are not readily susceptible to enzymatic attack. The subject nonionic polysaccharides have good stability in a saline environment, but the subject anionic polysaccharides have superb stability in a saline environment.

The drilling fluid of the invention possess the higher viscosity and lower fluid loss properties of high solids muds, but retains most of the high drilling rate properties of clear water. The drilling fluid prevents the accumulation and suspension of a high concentration of drilled solids in the drilling fluid.

The invention includes the process of preparing the novel drilling fluid. Preferably the nonionic and/or anionic water-soluble polysaccharides are admixed with the water, the polyglycol such as polyethylene glycol is admixed in and then the bentonite is admixed in.

The invention further includes the process of using the novel drilling fluid to assist in the drilling of oil, gas or geothermal wells, particularly in a saline environment.

Basically the invention is the discovery that certain blends of water-soluble components can be employed to beneficiate bentonite slurries so that greater viscosity yields can be realized in fresh water with excellent rheological profile characteristics (i.e., high viscosities with a yield stress character at low shear rates and significantly lower viscosities at high shear rates), and that such component blends are effective in beneficiating bentonite under highly saline conditions. The preferred components for beneficiating clays are synergistic ternary blends of ethylene oxide derivatives, nonionic polysaccharides and anionic polysaccharides. In fresh water slurries polyethylene glycols are particularly effective in the presence of nonionic polysaccharides in optimizing the rheological characteristics of the slurry—the anionic polysaccharides may be deleted from the blend for economic reasons. In such formulations the molecular weight of the polyethylene glycol is important in obtaining low shear rate yield stress characteristics and blends can be employed to maximize yield stress behavior at high temperatures for drill solids carrying capacity, and to minimize yield stress values at ambient temperatures to assist in solids removal from the surfaced mud. In saline solutions, polyethylene glycol of intermediate molecular weight and nonionic polysaccharides are effective in inhibiting syneresis (i.e., phase separation) and in providing good slurry rheological profiles at elevated temperatures. Anionic polysaccharides are utilized in saline (such as that encountered in off-shore drilling) compositions to ensure the proper structuring of bentonite in the wellbore filter cake for low fluid loss and to ensure good rheological behavior of the fluid at intermediate reservoir temperatures.

Specifically, the invention applies to a method of formulating such a drilling fluid so that it can be continuously circulated down through the hollow drill string to pick up the cuttings formed by the drill bit, carry them to the surface in the annulus surrouding the bit, and pass them through a series of mechanical devices and settling tanks to remove the drilled solids and return the drilling fluid to the drill string for recirculation—with essentially no loss of either vehicle or additives.

DETAILED DESCRIPTION OF THE INVENTION

Figure 1:
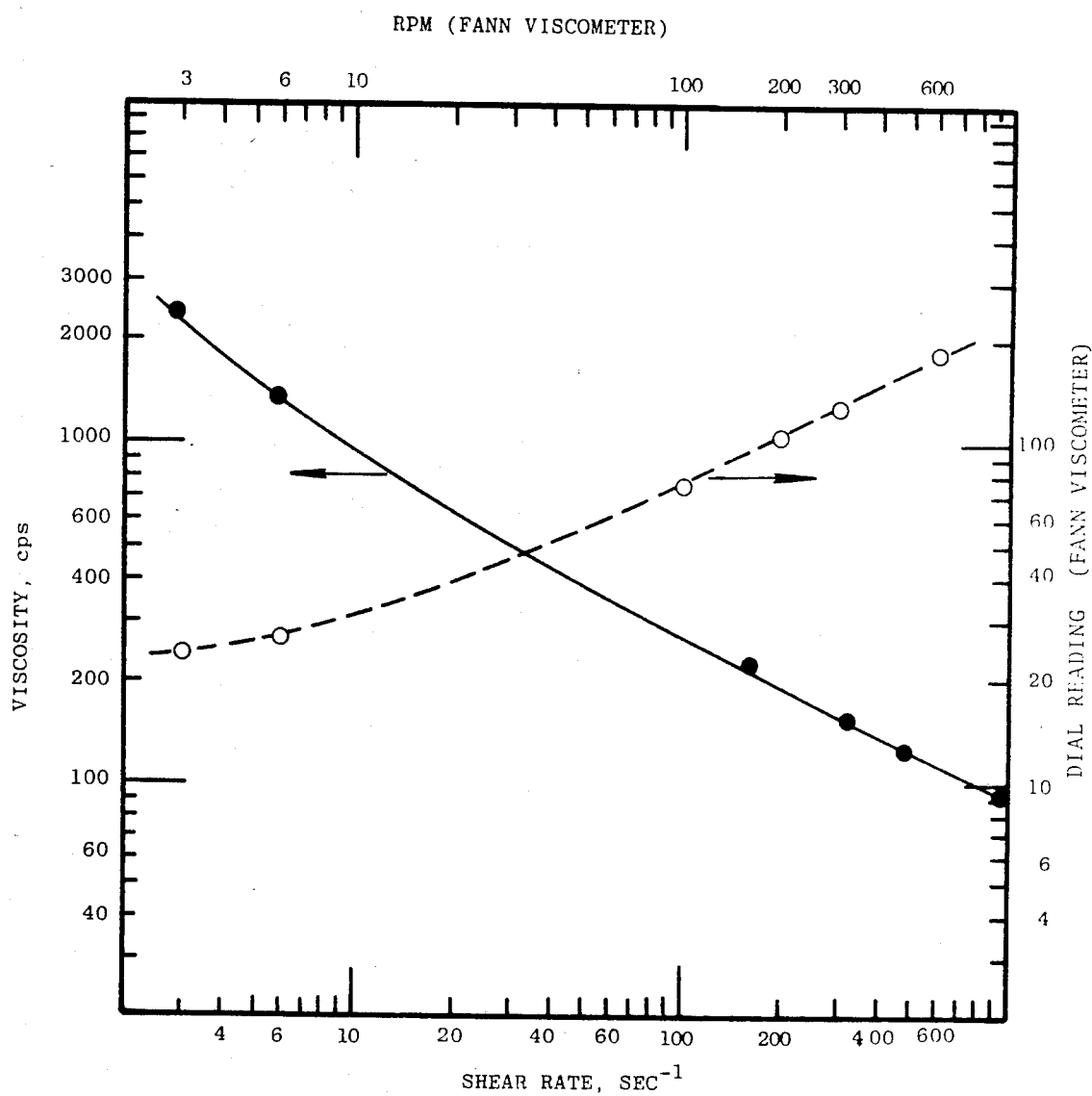
FIG. 1 is an industrial rheological analysis, in graph form, of an unmodified bentonite slurry in fresh water.

The invention involves modification of the conventional clay bentonitic-type drilling fluid system.

The drilling mud serves a number of functions, including carrying the bit cuttings out of the bore hole, lubricating the drill pipe and drilling tool, and providing a hydrostatic head in the well to prevent the uncontrolled escape of gases or liquids from various formations encountered during drilling. The drilling mud also serves to form a lining on the wall of the bore hole which helps to prevent the walls of the bore hole from caving and to plug up permeable formations and thereby prevent the flow of fluid from the well bore outwardly into the permeable formations. The normal procedure during drilling is to circulate the mud down through the interior of the drill pipe and then back up to the surface through the annulus between the drill pipe and the wall of the bore hole. The drilling fluid issuing from the well is usually passed over a screen and then through a ditch or trough to a mud pit, to be recirculated through the drill pipe by suitable pumps.

Some of the properties of the drilling fluid that are of major importance are viscosity, gel strength and density. The proper density is necessary to furnish sufficient hydrostatic head in the borehole so that the pressure exerted will exceed that of various fluids encountered in the formations traversed by the borehole. Weighting materials such as silica, iron oxide or barytes are usually added to the drilling mud to impart the proper density. Viscosity and gel strength are imparted by the clay or bentonite component.

The gel forming and viscosity characteristics of a drilling fluid are very important. In order to perform the function of carrying cuttings from the drill bit to the earth's surface where the cuttings drop out in the mud pit the drilling fluid must have a selected viscosity such that the fluid may be pumped through the system and also such that the cuttings will remain suspended in the fluid during the flow of the fluid up the bore hole. Also, the fluid, when it is relatively quiescent, should permit the cuttings to fall a few feet since it is essential that the cuttings settle out at the surface. On the other hand, the fluid should have the property of gelling on standing, in order to prevent undue settling of the cuttings in the well itself when drilling and circulation of fluid are temporarily halted. Accordingly, a drilling fluid should be thixotropic, i.e., it should be fluid when subjected to agitation but when standing should set to a gel of sufficient strength to retain cuttings in the time required for the cuttings to settle a few feet.

A typical drilling mud will have a density of from 9 to 18 pounds per gallon and in general, for satisfactory drilling, will have a viscosity below about 60 centipoises at 75° F. as measured on the Fann viscosimeter at 600 R.P.M.

The drilling mud or fluid is essentially a dispersion of a finely divided colloidal material, such as clay, bentonite or the like, in water, together with other stated materials so that the mud will have the special properties required to perform the several functions required of a drilling fluid. Or, stated another way, the solids content of a typical water based drilling fluid is in the range of about 5 to 7 percent of bentonite, the balance being water, chemical additives and finely divided drilled solids.

The clays that are most suitable for drilling fluids are of two general types; Western or natural sodium bentonitic clays and native or sub bentonite clays. The determining factor, so far as the use of a clay in the preparation of a drilling mud is concerned, is the yield value, i.e., the number of barrels of an aqueous dispersion or mud having a viscosity of 15 centipoises which can be prepared from a ton of clay. The Western and sub-bentonite clays exhibit different yield characteristics, apparently due to differences in their chemical compositions. A yield of anywhere from about 40 to 100 barrels is obtainable with the Western bentonitic clays, which are natural sodium clays. These clays are sometimes herein referred to as merely "bentonitic" clays. Sub-bentonitic clays are generally calcium or magnesium varieties of montmorillonite, but may contain substantial portions of non-clay or non-montmorillonite impurities. Any suitable bentonite clay (from whatever source or type) or sub-bentonitic clay can be used. Bentonite clay is a colloidal hydrated aluminum silicate which consists largely of the clay mineral montmorillonite. It has the ability to greatly swell by absorption of water.

Stokes law, which pertains to the settling velocities of small spherical particles in a liquid medium, is:

$$V = (2/9) \cdot (d_1 - d_2) g r^2 / n$$

wherein
v is the velocity (cm/sec.),
$d_1$ is the density of the sphere,
$d_2$ is the density of the liquid,
g is gravitational constant,
r is the radius of the sphere, and n is the viscosity of the liquid.

In accordance with Stokes Law, the ability of a fluid to suspend particulate matter is proportional to the viscosity of that medium and to the density of the suspended particle relative to the medium. In drilling a subterranean formation, the drilled solids to be removed from the wellbore must often be transmitted from great depths. The viscosity of the drilling fluid in the immediate vicinity of the drill bit (a high shear stress area) should be low for minimal resistance to the rotary action of the drill bit. As the fluid moves vertically upward from the drill bit, the shear rate decreases and the viscosity of a non-Newtonian fluid (e.g., a high total solids clay suspension or high molecular weight polymer thickened water) increases. The shear stress forces on the fluid approach zero at a relatively short distance from the drill bit and only low stresses are encountered in the upward movement of the liquid. The higher the viscosity of the fluid under these low shear stress conditions, the greater the carrying capacity of the fluid. The rheological profile as defined in Fann viscometer dial readings can be descriptively represented in terms of concave, linear or convex behavior in the low rpm measurements, and accordingly graphed. A concave behavior is indicative of a significantly increasing viscosity as the shear rate approaches zero and suggests the presence of a yield stress in the fluid (i.e., as a shear rate approaches zero a certain value will be reached wherein the fluid will become gel-like, thus increasing its capability to suspend particulate structures being transported to the surface of the wellbore). A convex profile indicates a leveling of the fluid to a constant viscosity (i.e., no marked increase in viscosity with continued decreasing shear rate and therefore no yield stress).

The invention is based on additives and compositions, predominantly nonionic in nature, for the beneficiation of bentonite in both fresh and saline slurries. The primary class of compounds employed are ethylene oxide derivatives (preferably polyglycols), nonionic polysaccharides and under certain specified conditions anionic polysaccharides. In fresh water slurries, polyethylene glycol derivatives of significantly different molecular weights are employed with nonionic polysaccharides for optimizing the rheological characteristics of bentonite slurries—the anionic polysaccharide can be deleted from the blend for economic reasons. In such formulations (i.e., a polyethylene glycol-nonionic polysaccharide blend) the molecular weight of the polyethylene glycol is important in obtaining low shear-rate yield-stress characteristics in fresh water slurries at elevated temperatures for maximum drill solids carrying capacity within the wellbore. The blend of beneficiating agents also affects decreasing yield stress character with decreasing temperature to permit drill solids removal at ambient surface conditions. In saline solutions polyethylene glycols of intermediate molecular weight (less than 30,000) and nonionic polysaccharides are effective in inhibiting syneresis (i.e., phase separation) and in providing good slurry rheological profiles at elevated temperatures. Anionic polysaccharides are utilized, (i.e., particularly in saline solutions) to ensure the proper structuring of bentonite in the wellbore filter cake for fluid loss control and to ensure optimum rheological characteristics of the slurry with the ternary blend of beneficiating agents at intermediate reservoir temperatures.

Polysaccharides are high molecular weight substances, normally, molecular weights of 30,000 to 14,000,000, made up of building units or moieties. Homopolysaccharides contain a single type of building unit; heteropolysaccharides contain two or more types of building units. The building units are monosaccharides or single sugar molecules. The polysaccharides are insoluble in liquids, but they can be readily catalytically converted by acids and alkalies into soluble derivatives. The homopolysaccharides include pentosans, $[(C_5H_8O_4)_n$, wherein n is greater than 7], such as, araban and xylan, or hexosans $[(C_6H_{10}O_5)_n$, wherein n is greater than 7], such as, starch, glycogen, dextrin, cellulose and inulin.

The heteropolysaccharides include agar, guar and gum arabic.

The nonionic and anionic polysaccharides and derivatives thereof which are useful in the invention include these based upon polysaccharides having the empirical formulae $(C_6H_{10}O_5)_x$, wherein x is at least 7, and $(C_{12}H_{20}O_{10})_n$, wherein n is at least 7. When x or n is less than 7, the saccharide compound is usually termed a oligosaccharide. In common usage, x and n each range from about 100 to about 5,000 or 10,000. Cellulose has a molecular weight ranging from 250,000 to 1,000,000 or more, so there are at least 1500 glucose units per cellulose molecule. The degree of polymerization in cellulose is normally 3,500 to 10,000. Concerning cellulose derivatives, the degree of substitution (D.S.) is defined as the average number of hydroxyl groups, of the three available in the anhydroglucose unit, that have been substituted. MS is defined as the number of moles of reagent combined per anhydroglucose unit. Usually a very high D.S. reduces water solubility or eliminates it.

The nonionic polysaccharides useful in this invention are typically those which contain hydroxyalkyl groups or alkylhydroxyalkyl groups although any suitable nonionic polysaccharide can be used. The preferred groups of nonionic polysaccharides is the nonionic water-soluble derivatives of the cellulose ethers. Examples of useful nonionic cellulosic derivatives include: hydroxyethyl cellulose (which is the most preferred) hydroxypropyl cellulose ($ROCH_2CHOHCH_3$), hydroxybutyl cellulose, hydroxyethylmethyl cellulose, hydroxypropyl methyl cellulose, methylhydroxypropyl cellulose, ethylhydroxyethyl cellulose, methylhydroxyethyl cellulose, hydroxybutylmethyl cellulose, hydroxyethyl methyl cellulose, and methyl cellulose.

Hydroxyethyl cellulose is a nonionic cellulose ether, has the formula $ROCH_2CH_2OH$ and is water-soluble at an MS of 1.5 to 2.5. When the nonionic polysaccharide has hydroxyalkyl groups, the alkyl group preferably has 1 to 4 carbon atoms.

Examples of other useful nonionic polysaccharides are nonionic, water-soluble guar derivatives, such as, hydroxypropyl guar, and nonionic, water-soluble starch derivatives, such as, hydroxybutyl starch, methyl starch, hydroxyethyl starch, hydroxyethyl methyl starch and hydroxypropyl methyl starch.

The useful anionic, water-soluble polysaccharides include carboxymethyl cellulose and sodium carboxymethylhydroxyethyl cellulose. Carboxymethyl cellulose or CMC is sodium carboxymethyl cellulose or $ROCH_2COON_a$. The former term is used herein for convenience. Carboxymethyl cellulose is an anionic cellulose ether and is water-soluble at a degree of substitution of 0.4 or greater. (The free acid carboxymethyl cellulose is also water-soluble until it has been dried.)

Examples of the useful polyglycols, that is, polymers of glycols or alcohols having two hydroxyl groups (i.e., dihydric alcohols), are: polyethylene glycol (the most preferred), polypropylene glycol, poly(1,3-propanediol), poly(1,2-butanediol), poly(1,4-butanediol), poly(1,2-propanediol), poly(2,3-butanediol), poly(1,3-butanediol), poly(1,5-pentanediol), and poly(1,12-octadecanediol). The polyglycols are preferably straight-chained.

The polyethylene glycols useful within the scope of the invention can be characterized by the formula $H(OCH_2CH)_nOH$ wherein n is a number which restricts the average molecular weight of the polyethylene glycol to form about 600 to about 30,000, or by the formula $HOCH_2(CH_2OCH_2)_xCH_2OH$ wherein x is a number which restricts the average molecular weight of the polyethylene glycol to form about 600 to about 30,000. Polyethylene glycols having an average molecular weight of 1000 or above are freely soluble in water. But as their molecular weight greatly increases, water solubility decreases. Commercially available polyethylene glycols are usually designated by a number that roughly corresponds to the average molecular weight. Examples of useful polyethylene glycols are polyethylene glycol 600, polyethylene glycol 1000, polyethylene glycol 4000 and polyethylene glycol 6000.

Polyethylene glycols can be prepared by polymerizing ethylene oxide or ethylene glycol.

As already stated, normally hydroxyethyl cellulose and bentonite cannot be used together for the undesirable aspects of each component prevails in the composite. But certain components alone or in combination are effective in suppressing the undesirable properties of hydroxyethyl cellulose-bentonite blends, and when added to such aqueous slurries, these components are effective in enhancing the desirable aspects (i.e., good fluid loss control, excellent rheology, low total solids and salinity tolerance) from both hydroxyethyl cellulose and bentonite. In both fresh and salt (5.5 wt. percent) water solutions, the ratio of the additive (i.e., an intermediate molecular weight polyethylene glycol) or additive blend to the polysaccharide (i.e. hydroxyethyl cellulose, polypropylene glycol and carboxymethyl cellulose) and the relative amount of both added to bentonite slurries is important, as are the molecular weights of the additives, in achieving the correct or desirable drilling fluid properties. Furthermore, the ratio in the additive blend (e.g., polyethylene glycol to triethanolamine, etc.) is important in achieving optimum performance in highly saline solutions. The primary additives are preferentially high ethylene oxide containing materials (e.g., polyethylene glycol, polyethylene oxide, UCON® fluids (ethylene oxide/propylene oxide copolymers), Tergitol surfactants, etc.). Secondary additives, such as, polyalkylene amines, polyalkylene imines, ethanolamines, etc. can be used—the latter are particularly useful as secondary blends in saline solution slurries.

The secondary additives include: ethanolamines, such as, ethanolamine, diethanolamine and triethanolamine; polyalkylene (primary) amines, such as, ethylenediamine, trimethylenediamine, tetramethylenediamine, diethylenetriamine, triethylenetetramine, tetraethylenepentamine, hexamethylenetetramine, 6,6'-diaminodihexylamine, and diaminopropyltetramethylenediamine; polyalkylene substituted (secondary and tertiary) amines, such as: N,N-dimethyl-1,3-propanediamine, N,N'-dimethyl-1,3-propanediamine, N-methylethylenediamine, N,N,N',N'-tetramethyl-1,3-butanediamine, N,N'-dimethyl-1,2-propanediamine, 1,2-propylenediamine, 1,3-propylenediamine, N,N,N',N'-tetramethylmethylenediamine, N,N,N',N'-tetramethyl-1,4-butanediamine, N,N,N',N'-tetraethylmethylenediamine, N,N-dimethylethylenediamine, 1,1,7,7-tetraethyldiethylene-triamine, N,N,N'-triethyl-N'-methylethylenediamine, N,N,N',N'-tetraamylethylenediamine, N,N-diethylethylenediamine, N,N'-diethylethylenediamine, N,N-diethyl-N'-methylethylenediamine, 3,3'-diamino-N-methyldipropylamine, N,N,N',N'-tetramethyl-1,6-hexanediamine, 1,4,7-trimethyldiethylene triamine, N,N,N'-trimethylethylenediamine, N,N-dibutyl-1,3-propanediamine, N',N'-diethyl-1,4-pentanediamine, N,N-diethyl-1,3-propanediamine, N,N,N',N'-tetramethyl-1,3-propanediamine, 1,4,7,10-tetramethyltriethylenetetramine, 1,7-diethyl-4-methyl-diethylenetriamine, and N,N'-dimethylethylenediamine; and polyalkylene imines, such as, polyethylene imine.

The drilling fluids can also contain conventional wellbore additives, such as, viscosifiers, such as, gums, and the like, lignosulfonate salts such as calcium or chromium lignosulfonates, emulsifiers, weighting agents, calcium carbonate, magnesia and other agents. It is understood that not all of these possible constituents will necessarily be present in any one wellbore fluid but their selection and use will be governed by other constituents and the use for which the drilling fluids is intended.

Hydroxyethyl cellulose, hydroxypropyl guar, and the like, are known to be effective in shale stabilization and in solids control in drilling fluids, particularly in low solids muds where fast drilling rates can be obtained. Such water-soluble polymers, however, do not provide the best rheology (i.e., high viscosity at low shear rate, etc.) for solids removal nor do they provide outstanding fluid loss control. The desired low viscosity at high shear rates and high viscosity at low shear rates and excellent fluid loss control (FLC) can be obtained through the use of clays such as bentonite, but such high solids approach does not allow achievement of fast drilling rates. Low molecular weight copolymers (e.g., maleic acid/vinyl acetate) have been effective in beneficiating such clays so that about one half of the normal amount of clay can be used while retaining good fluid loss control and most of the desired rheological properties in fresh water solutions. But in highly saline environments (e.g., off-shore wells) there is not any effective means in the prior art of achieving good low solids (i.e., clay beneficiated) drilling fluids. The drilling fluid of the invention solves the prior art problem.

The advancement in the art of the invention is that a viscosity reducing component, such as, intermediate molecular weight polyethylene glycol, can be used with hydroxyethyl cellulose to beneficiate bentonite in order to increase the viscosity of the intermediate solids level bentonite slurries, to obtain yield stress characteristics not evident when either of the organic polymer beneficiating agents is used alone, and to provide rheological profiles which are in many cases more ideal than high solids bentonite slurries in fresh water. These reagents are effective in highly saline environments, and are not limited to less than 1200 ppm divalent ion concentrations (as taught in U.S. Pat. No. 3,953,336). The employment of intermediate molecular weight polyethylene glycols with hydroxyethyl cellulose provides excellent rheological characteristics with fluid loss control in freshwater slurries, and unique yield stress characteristics at elevated temperatures with decreasing yield stress behavior at ambient surface temperatures to provide an intermediate solids bentonite drilling fluid having excellent carrying capacities in the wellbore and with ease of solids removal at ambient surface temperatures. In addition, the compatibility of both beneficiating agents permits the use of high salt levels in intermediate solids bentonite muds to stabilize shale encountered in most wellbores and also permits solids removal in highly saline environments. Excellent rheologoical profiles are observed at higher temperatures and the introduction of anionic polysaccharides such as carboxymethyl cellulose, Xanthomonas campestris polysaccharides, polyacrylic acid or acrylamide/acrylic acid copolymers and/or maleic acid/vinyl acetate copolymers permit excellent rheological characteristics with fluid loss control at intermediate reservoir temperatures.

The examples set forth below illustrate the practice of the invention. The drawings are discussed in detail below in conjunction with the examples.

The following procedures were used in preparing the various drilling fluid samples used in the examples and in conducting the testing of the various drilling samples.

All of the polymers employed in the examples were dispersed in water for approximately 10 seconds in a Waring blender. This procedure yields good dispersions for all of the water-soluble polymers and prevents the clumping of particulates which make complete dissolution difficult. After the 10 second high-shear dispersion, the slurries were immediately transferred to wide mouth containers where each of the slurries was stirred under low rpm conditions for several hours until complete dissolution was evident (unless the surface of the particles were glyoxal treated wherein small amount of caustic addition achieved immediate viscosity build-up). The amount of polymer added varied from 1 to 3 grams per 350 cc of water (the equivalent of 1 or more lbs/bbl). Lbs/bbl is pounds per barrel. Materials such as low molecular weight polyethylene glycols were added to the viscous solutions under low rpm mixing. To the approximate 350 grams of thickened solution, a given weight of API bentonite (to obtain 14.4, 21.6 or 28.8 lbs/bbl final concentrations) were added in a multimixer blender where highspeed mixing was maintained for 20 minutes. The bentonite (Aquagel-Baroid Corp.) was of API specified quality for drilling mud applications. If the solutions were to be saline, the salts (5.0 wt. percent of sodium chloride and 0.5 wt. percent of calcium chloride) were added immediately (less than 1 minute) after the bentonite had been added and wetted in the multimixer blender. All of the solutions were allowed to stand overnight before the standard API tests (described below) were conducted.

In the hydroxyethyl cellulose thickened, weighted completion muds, the aqueous solution was first supersaturated with calcium chloride (to yield approximately 42 percent of total solids). To these saturated solutions hydroxyethyl cellulose, which had been surface treated with glyoxal, was added under low rpm mixing conditions. The solutions were stirred for 2 hours.

The samples were rheologically characterized using a Fann Viscometer, Model No. 35A. In certain instances data in these studies were recorded on a Brookfield LVT viscometer or with a Rheometrics Mechanical Spectrometer. Thermally insulated heating wells were used to make rheological measurements at 150° F., after the materials had been enclosed at those temperatures for approximately 20 minutes. Temperatures were recorded electronically with thermocouples.

Fluid loss control studies were conducted under 100 psi nitrogen pressures in enclosed containers. These studies employed No. 50 hardened, Whatman 9.0 cm filter paper, in accord with the standard API test procedure.

The water-soluble polymers or oligomeric additives used in the examples were:
 hydroxyethyl cellulose (CELLOSIZE ® QP-100M, QP-4400H grades, Union Carbide Corp.)
 Natrosol 250HHR (Hercules Corp.)
 hydroxypropyl guar (Jaguar HPG-11)
 unmodified guar gum (Celanese Corp.)
 acrylamide/acrylic acid copolymer (Pusher 700-Dow Chemical Company)
 maleic acid/vinyl acetate copolymer (Benex-Monsanto Corp.)
 Xanthomonas Campetris polysaccharide (Galaxy-General Mills or Xanflo-Kelco Corp.)
 polyethylene glycols (CARBOWAX ®6,000 or 20M-Union Carbide)
 ethylene oxide/propylene oxide copolymers (UCON ® fluids-Union Carbide Corp.)
 acrylic acid/ethyl acrylate copolymer (Acrysol G-110, Rohm and Haas Corp.).

EXAMPLE 1

Using the above-described procedure, a classical and standard industrial rheological analysis of unmodified bentonite (28.8 lbs/bbl) slurry in fresh water at 72° F. was made. The viscosity characteristics of a bentonite-thickened water standard are graphed in FIG. 1. The classical rheological profile (i.e., viscosity as a function of shear rate) is illustrated as well as the actual Fann viscometer (an instrument commonly used to approximate viscosity in the petroleum industry) instrument readings.

EXAMPLE 2

Figure 2:
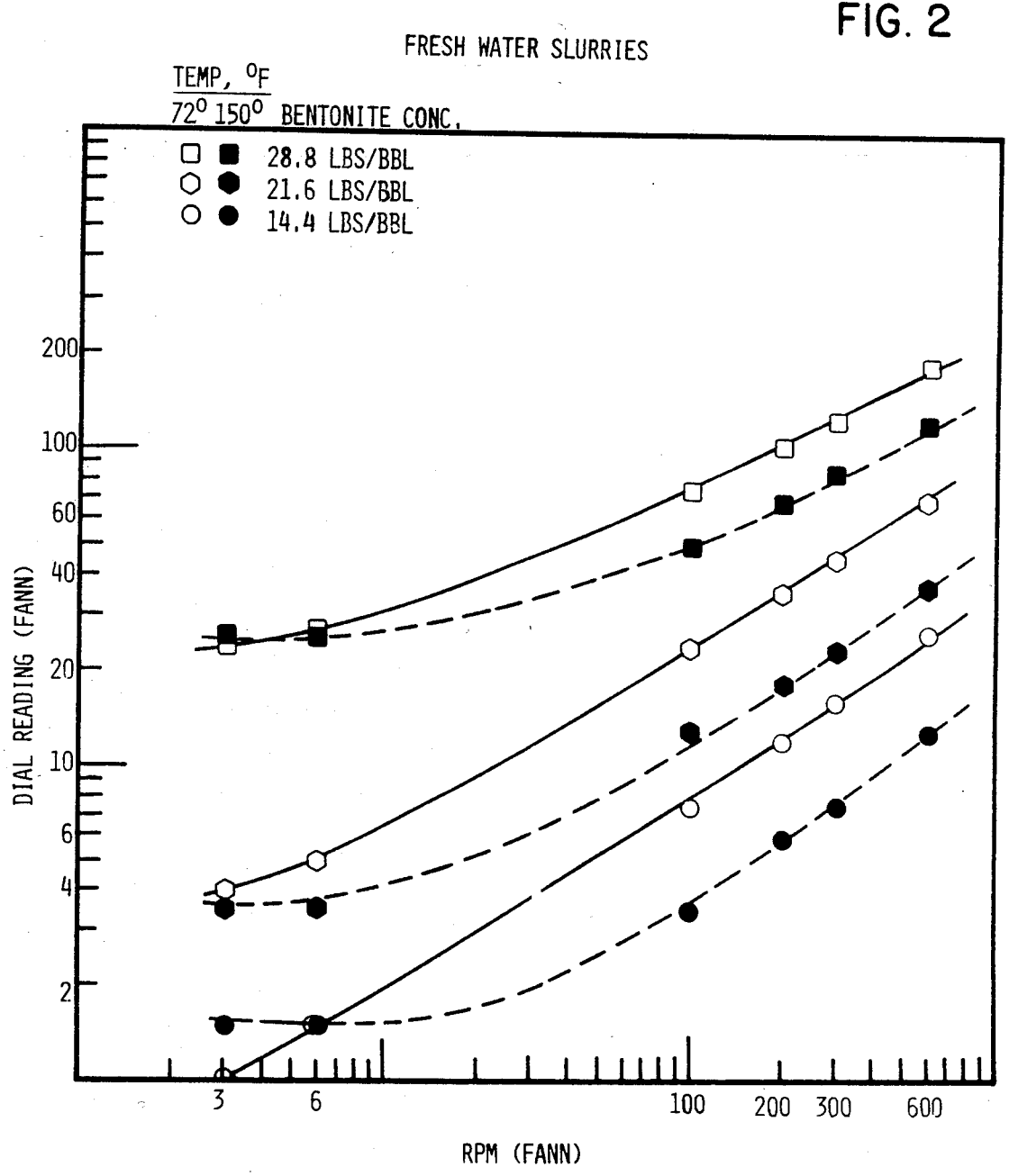
FIG. 2 is a Fann viscometer rheological characterization, in graph form, of various bentonite slurries.

Using the above-described procedure, the Fann viscometer rheological characterizatics of various fresh water bentonite slurries were determined. The results of the tests are graphed in FIG. 2. In FIG. 2, concerning the temperature level used, the open symbols (solid lines) are the 72° F. measurements and the closed symbols (dashed lines) are the 150° F. measurements, and concerning the bentonite concentrations, the symbols □ and ■ are for 28.8 lbs/bbl, the symbols ◯ and ● are for 21.6 lbs/bbl, and the symbols ○ and ● are for 14.4 lbs/bbl. A high concentration of bentonite (about 28.8 lbs/bbl) provides an acceptable rheological profile for drilling (which improves with temperature, see FIG. 2), but the high total solids of the fluid prohibits fast drilling rates. Lower solids systems permit faster drilling rates, but the desirable rheological profile (i.e., a low dial reading at high rpm, a concave profile at low rpm, etc.) are lost.

The fluid characteristics in FIGS. 2 to 11 are presented as direct Fann viscometer readings (in the established practices of the industry).

EXAMPLE 3

Figure 3:
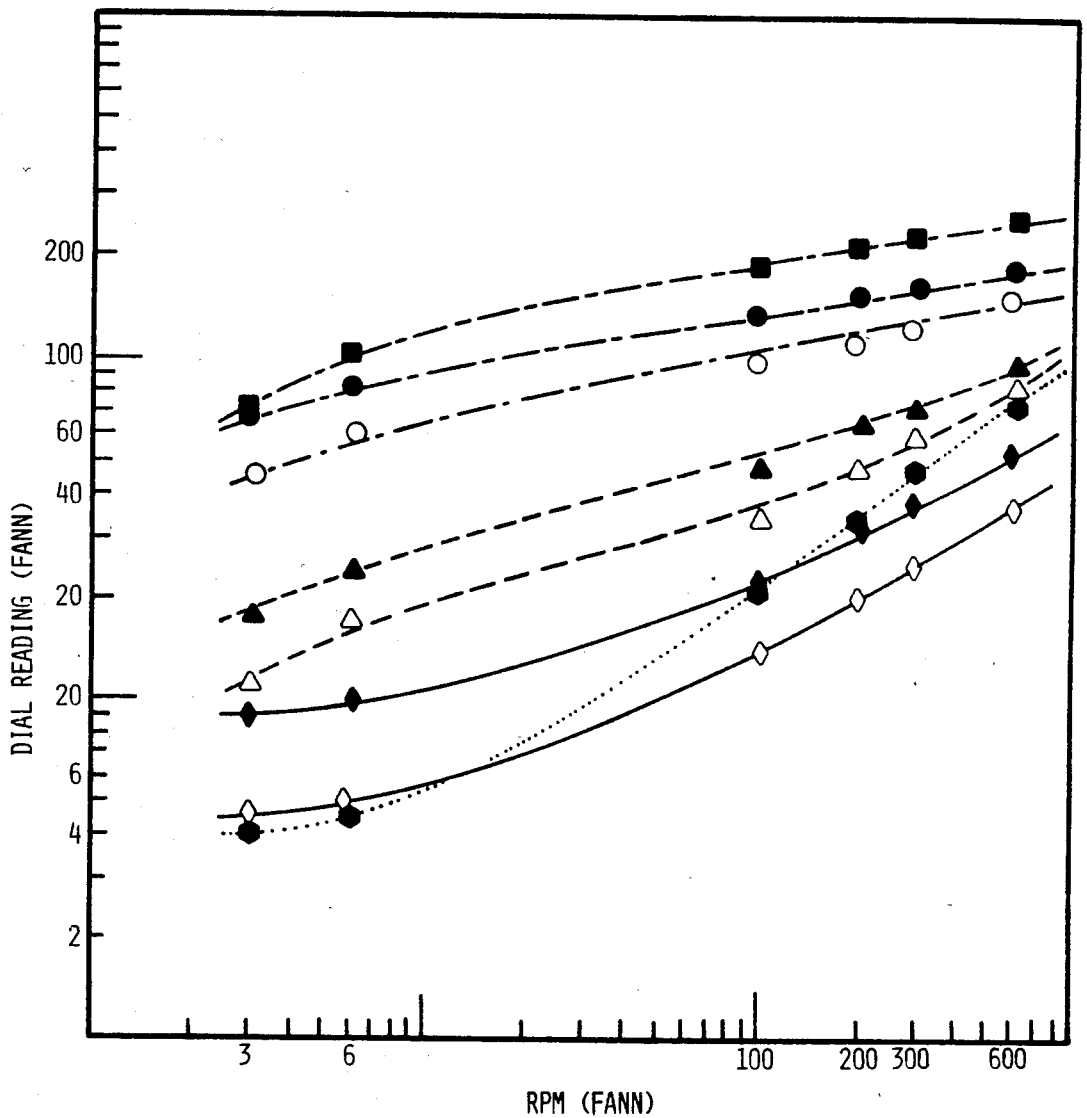
FIG. 3 is a graph of the rheological characteristics of various fresh water slurries of beneficiated bentonite.

Using the above-described procedure, the rheological characteristics of various fresh water slurries of 14.4 lbs/bbl beneficiated bentonite were determined. The results of the tests are graphed in FIG. 3. In FIG. 3, concerning the beneficiating agents, the symbol ■ is for 1 lb/bbl of hydroxyethyl cellulose, (HEC)$\overline{M}_w = 4 \times 10^5$, the symbol ● is for 1 lb/bbl of hydroxyethyl cellulose, (HEC)$\overline{M}_w = 10^6$, the symbol ○ is for 0.5 lb/bbl of hydroxypropyl guar (HPG-11), the symbol ▲ is for 1 lb/bbl of acrylamide/acrylic acid copolymer (PAMC), the symbol ⌢ is for 0.5 lb/bbl of PAMC, the symbol ◆ is for 1 lb/bbl of Xanthomonas campestris polysaccharide (XCPS), the symbol ◇ is for 0.5 lb/bbl of XCPS, and the symbol ● is for 1 lb/bbl of maleic acid/vinyl acetate copolymer (MAVAC).

Water-soluble polymers (W-SPs) can be used to increase the viscosity of clay slurries of lower-total-solid levels (see FIG. 3). Such beneficiated systems represent a compromise between an expensive "mud" thickened only with water-soluble polymer (which permits faster drilling rates and can be salt insensitive) and a slow drilling rate, high-total-solids bentonite thickened mud (a more economical mud with greater viscosity stability to shear-stress and thermal-oxidative degradation and excellent fluid loss control in fresh water systems). In addition, beneficiation using water-soluble polymers permits the use of off-grade bentonite.

Beneficiations of bentonite fresh water slurries with different water-soluble polymers did not provide muds with similar rheological characteristics (see FIG. 3). Nonionic polysaccharides (specifically hydroxyethyl cellulose and hydroxypropyl guar) did not provide the desirable concave response at low rpm; only Xanthomonas campestris polysaccharide (XCPS) and a maleic acid/vinyl acid copolymer (MAVAC) provided the desired low rpm profile. Xanthomonas campestris polysaccharide is known to disperse not only bentonite but other drilled solids very well. This inhibits solids removal and results in differential sticking of the drill string; Xanthomonas campestris polysaccharide is also known to be extremely susceptible to enzymatic attack (see U.S. Pat. No. 3,953,336). The maleic acid/vinyl acid copolymer is known for its extreme salt sensitivity. The bentonite-hydroxyethyl cellulose mixture does not exhibit yield stress characteristics at low shear rates and hydroxyethyl cellulose is not used as a beneficiating agent for bentonite slurries, despite its great compatibility with saline environments (particularly divalent ions).

A dimensionless viscosity index (DVI) was empirically derived to reflect the important aspects of the profiles illustrated in FIGS. 2 and 3. The parameter is defined as:

$$DVI = \log\left\{ \left[ \frac{FR\ (6\ rpm) + FR\ (100\ rpm)}{FR\ (600\ rpm) - FR\ (100\ rpm)} \right] \left[ \frac{FR\ (600\ rpm) - FR\ (3\ rpm)}{FR\ (6\ rpm) - FR\ (3\ rpm)} \right] \right\}$$

wherein FR is the Fann viscometer reading at the specified rpm. The DVI parameter as defined places a heavy emphasis on the presence of a yield stress [FR (6 rpm) − FR (3 rpm)]; a value of 0.1 was defined for this difference to calculate the values in Table I below when the Fann dial reading at 6 and 3 rpm were approximate. Emphasis is also placed upon the absolute value of the drilling fluid's viscosity and upon the incremental difference between high and low shear rate viscosities. The DVI values for slurries with bentonite at various levels, and bentonite slurries beneficiated with various water-soluble polymers at various weight levels are set out in Table I below:

TABLE I

DIMENSIONLESS VISCOSITY INDEX[a] OF TYPICAL DRILLING FLUIDS

| | DVI | |
|---|---|---|
| | 72° F. | 150° F. |
| Bentonite, | | |
| 28.8 lbs/bbl | 1.70 | 3.01 |
| 21.6 lbs/bbl | 1.61 | 2.32 |
| 14.4 lbs/bbl | 1.34 | 1.82 |

14.4 lbs/bbl Bentonite, Water-soluble Polymer Beneficiated Slurries

| | lbs/bbl | DVI |
|---|---|---|
| XCPS[b] | 0.5 | 1.80 |
| | 1.0 | 1.70 |
| | 1.5 | 1.61 |
| | 2.0 | 1.84 |
| MAVAC[c] | 1.0 | 1.85 |
| | 2.0 | 1.63 |
| | 2.5 | 1.54 |
| CMC[d] | 0.5 | 1.65 |
| | 1.0 | 1.60 |
| PAMC[e] | 0.5 | 1.21 |
| | 1.0 | 1.35 |
| HEC[f], | | |
| $\overline{M}_w = 10^6$ | 1.0 | 1.55 |
| $\overline{M}_w = 4 \times 10^4$ | 1.0 | 1.35 |

Notes:
[a]DIV =

$$\log\left\{ \left[ \frac{FR\ (6\ rpm) + FR\ (100\ rpm)}{FR\ (600\ rpm) - FR\ (100\ rpm)} \right] \left[ \frac{FR\ (600\ rpm) - FR\ (3\ rpm)}{FR\ (6\ rpm) - FR\ (3\ rpm)} \right] \right\}$$

where FR = Fann Viscometer Dial Reading
[b]Xanthomonas campestris polysaccharide (General Mills Corp.)
[c]Maleic acid/vinyl acetate copolymer (Monsanto Corp.)
[d]Carboxymethyl cellulose, degree of substitution = 0.9 (Hercules Corp.)
[e]Acrylamide/acrylic acid copolymer (Dow Chemical Co.)
[f]Hydroxyethyl cellulose (Union Carbide Corp.)

The DVI parameter is qualitative rather than quantitative. For example, a 28.8 lbs/bbl unmodified, fresh water bentonite formulation at ambient conditions was a better drilling fluid (particulate carrying capacity) than a 14.4 lbs/bbl concentration at 150° F. (see FIG. 2), but this is not apparent in the DVI values (see Table I) because of the strong emphasis on yield stress character in the DVI calculation.

It is evident from the data graphed in FIG. 2 (and reflected in the DVI values in Table I) that the yield stress character of bentonite slurries increases with temperature. This phenomenon is also observed in hydroxyethyl cellulose-component blend beneficiated slurries to be described in later illustrations. Consequently, for such systems, DVI values greater than 1.6 are considered to identify promising drilling fluids.

EXAMPLE 4

Figure 4:
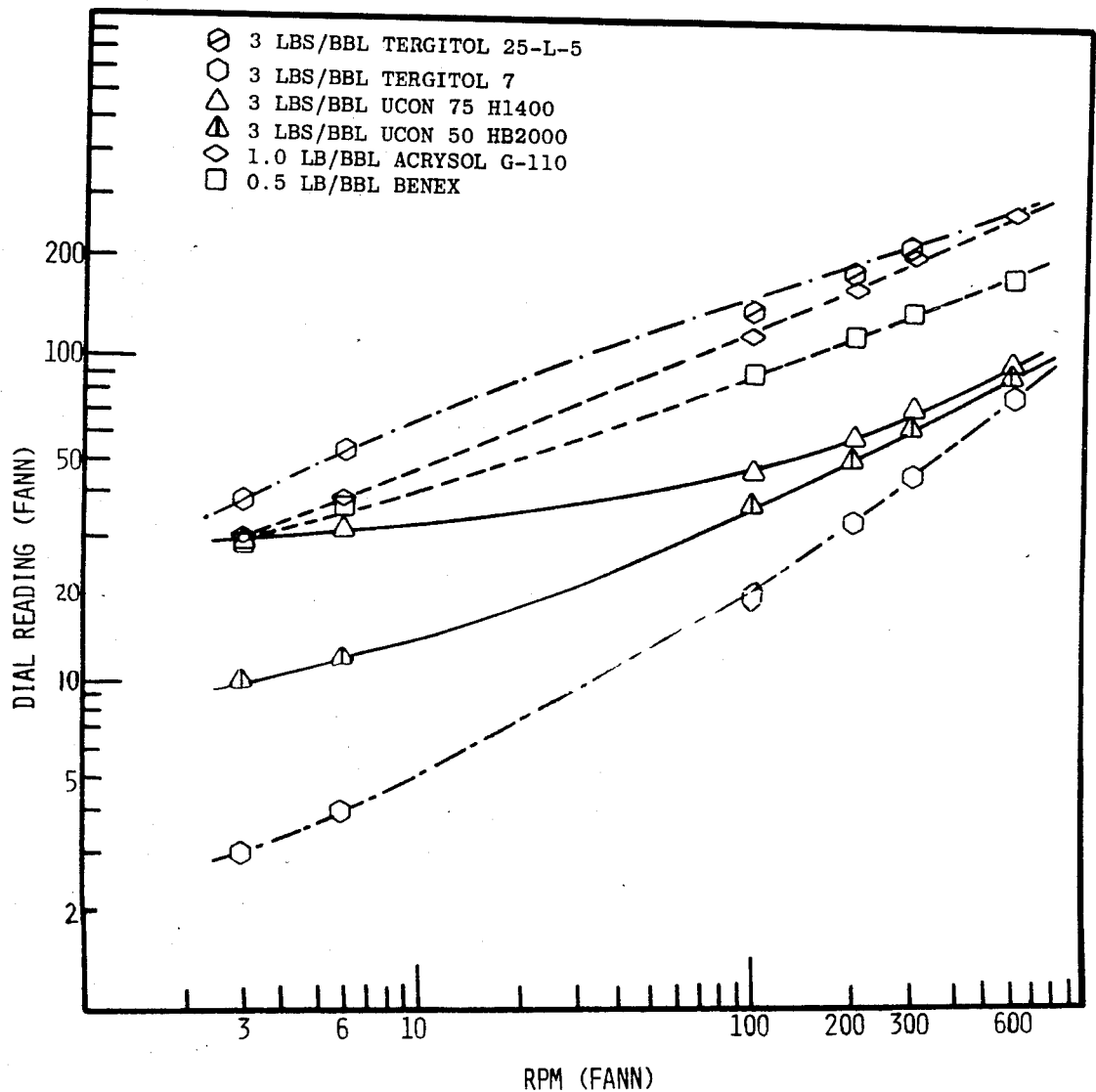
FIG. 4 is a graph of the rheological characteristics of various fresh water slurries of bentonite beneficiated with hydroxyethyl cellulose and other agents.

Using the above-described procedure, the rheological characteristics of various fresh water slurries of 14.4 lbs/bbl of bentonite beneficiated with 1 lb/bbl of hydroxyethyl cellulose, $\overline{M}_w = 10^6$ and various surface-active materials at various weight levels were determined. The results of the tests are graphed in FIG. 4. In FIG. 4, concerning the surfactants, the symbol ◔ is for 3 lbs/bbl of TERGITOL ® non-ionic surfactant 25-L-5, the symbol ○ is for 3 lbs/bbl of TERGITOL ®-7, the symbol △ is for 3 lbs/bbl of UCON ®75H 1400, [an ethylene oxide (75 percent propylene oxide (25 percent copolymer EOPOC)], the symbol ▲ is for 3 lbs/bbl of UCON ®50 HB 2000 (a 50 percent EOPOC), the symbol ◇ is for 1.0 lb/bbl of acrylic acid/ethyl acrylate copolymer (PAAC) and the symbol □ is for 0.5 lb/bbl of maleic acid/vinyl acetate copolymer (MAVA).

It was checked to see if the salt compatibility of hydroxyethyl cellulose or other nonionic polysaccharides could be utilized in maximizing bentonite slurry viscosities when more surface-active materials were employed to preferentially interact with the slurried bentonite particles. Surfactants (e.g., ethoxylated compounds containing long chain nonyl phenol units or aliphatic hydrophobes, or ethylene oxide copolymers containing propylene oxide segments to substantially enhance the surface activity of such polymeric entities) were investigated in bentonite slurries which also contained hydroxyethyl cellulose (see FIG. 4). The materials which were most surface active were not as effective in accomplishing an optimized rheological profile as their less surface active analogs containing higher amounts of ethylene oxide. Blends containing acid copolymers (see FIG. 4) were also effective (in fresh water slurries) in modifying the hydroxyethyl cellulose-bentonite viscosities to produce more desirable rheological profiles. However, these latter blends are not compatible with saline environments.

EXAMPLE 5

Figure 5:
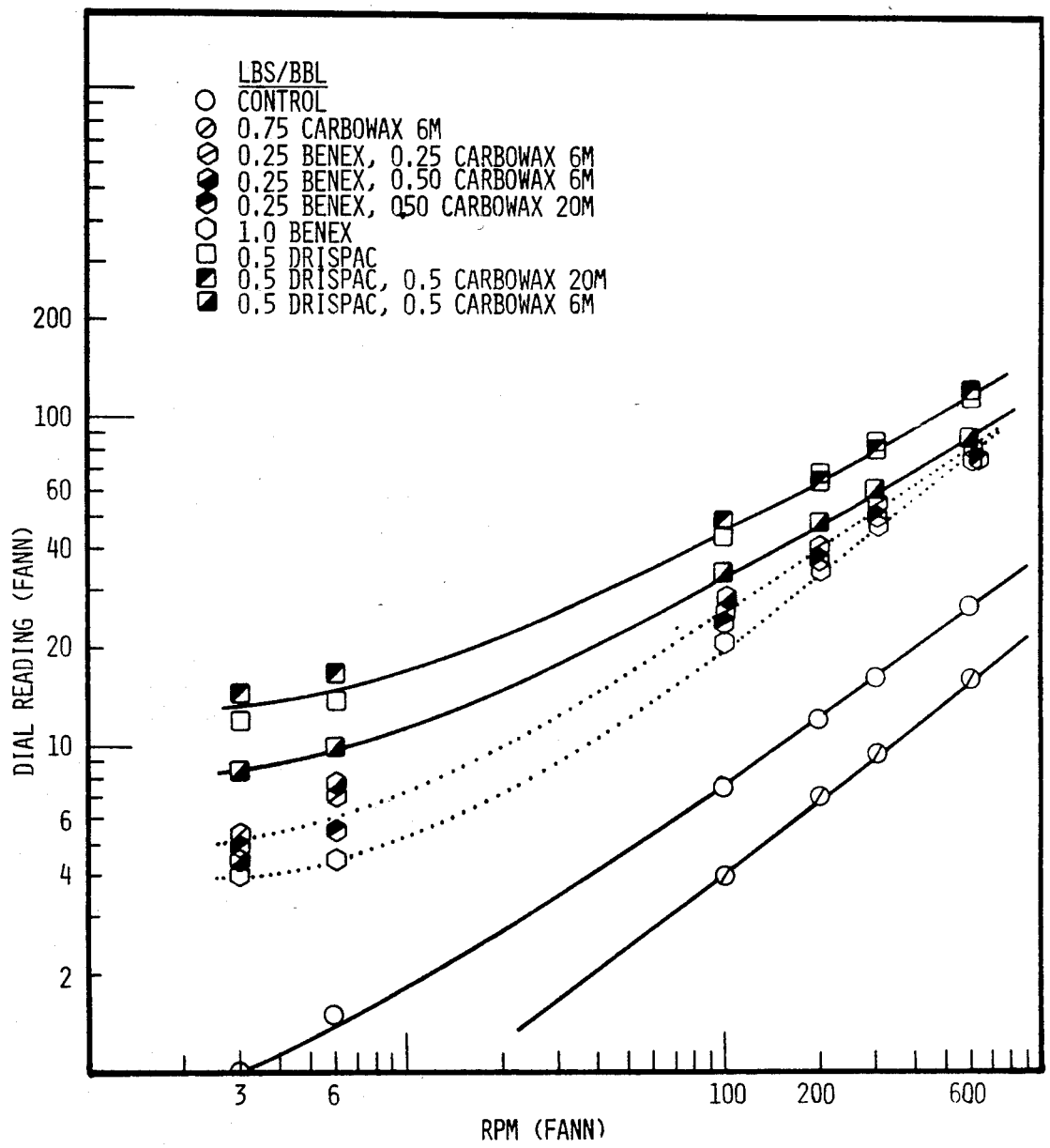
FIG. 5 is a graph of the rheological characteristics of various fresh water slurries of beneficiated bentonite.

Using the above-described procedure, the rheological characteristics of various fresh water slurries of 14.4 lbs/bbl bentonite beneficiated with polyethylene glycol alone and with various other agents were determined. The results of the tests are graphed in FIG. 5. In FIG. 5, concerning the beneficiation agents, the symbol ① is of 0.75 lb/bbl of polyethylene glycol, $\overline{M}_w=6,000$ (PEG 6M), the symbol ⊕ is for 0.25 lb/bbl of maleic acid/vinyl acetate copolymer, and 0.25 lb/bbl of PEG 6M, the symbol ◐ is for 0.25 lb/bbl of maleic acid/vinyl acetate copolymer and 0.50 lb/bbl of PEG 6M, the symbol ◑ is for 0.25 lb/bbl of maleic acid/vinyl acetate copolymer and 0.50 lb/bbl of PEG, $M_w=25,000$ (PEG 20M), the symbol ○ is for 1.0 lb/bbl of maleic acid/vinyl acetate copolymer, the symbol □ is for 0.5 lb/bbl of carboxymethyl cellulose, degree of substitution, (D.S.)=0.9 (CMC), the symbol ▨ is for 0.5 lb/bbl of carboxymethyl cellulose and 0.5 lb/bbl of PEG 20M, and the symbol ▨ is for 0.5 lb/bbl of carboxymethyl cellulose and 0.5 of PEG 6M.

The marked effect that polyethylene glycols have on hydroxyethylcellulose-bentonite rheological profiles is not observed in other systems. Polyethylene glycol alone lowers the viscosity of bentonite slurries (as disclosed in U.S. Pat. No. 2,589,949 and illustrated in FIG. 5). However, polyethylene glycol slightly raises maleic acid/vinyl acetate copolymer-beneficiated slurry viscosities, but without significantly affecting the differences between high and low shear rate viscosity values (see FIG. 5). In carboxymethyl cellulose-beneficiated clay slurries, the rheological profile is not significantly influenced by the addition of polyethylene glycol.

EXAMPLE 6

Figure 6:
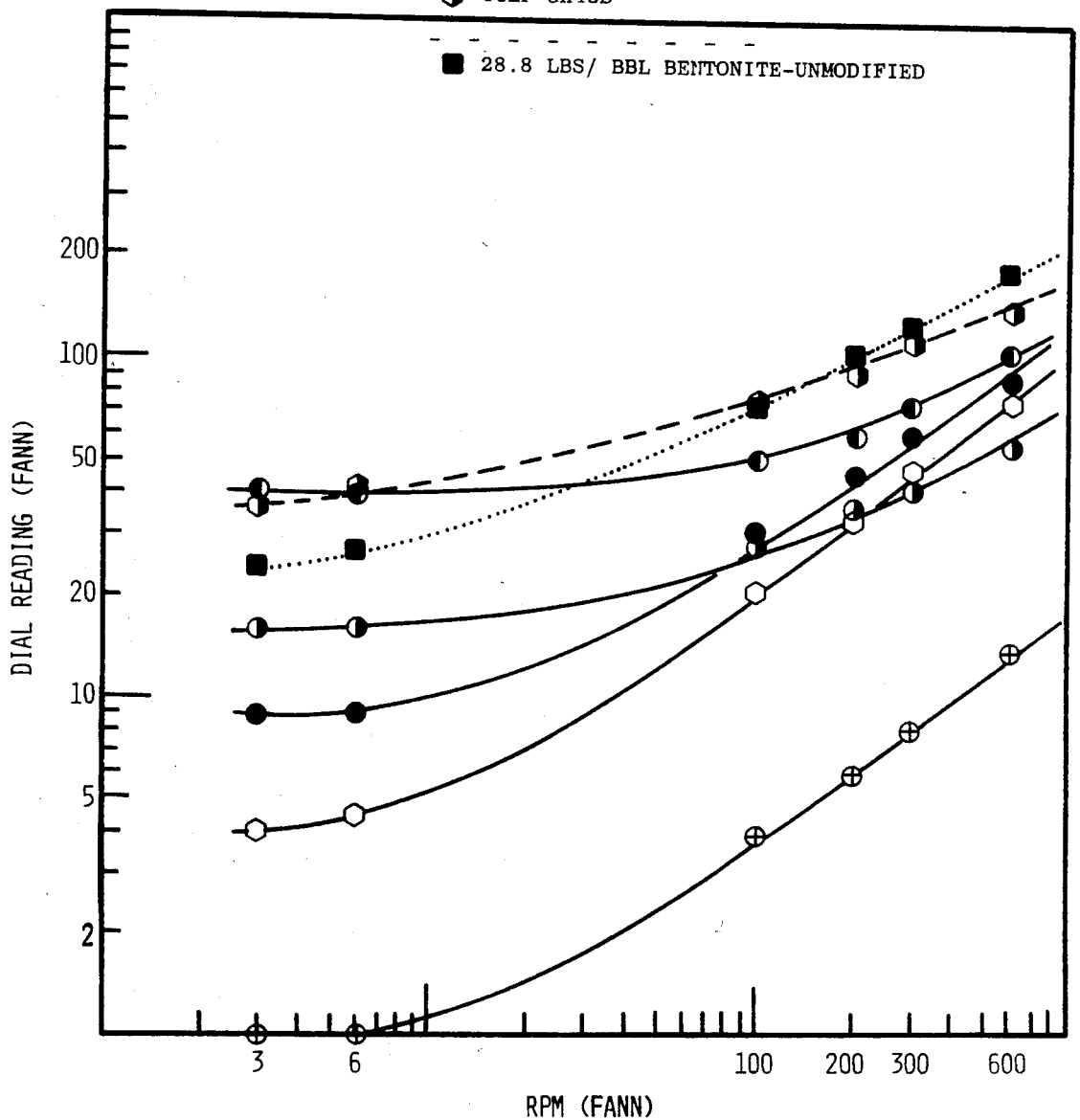
FIG. 6 is a graph of the rheological characteristics of various fresh water slurries of beneficiated bentonite.

Using the above-described procedure, the rheological characteristics of various fresh water slurries of 14.4 lbs/bbl bentonite beneficiated with combinations of hydroxyethyl cellulose and various other agents were determined. The results are graphed in FIG. 6. In FIG. 6, concerning the beneficiation agents, the symbol ◐ is for 0.5 lb/bbl of hydroxyethyl cellulose ($\overline{M}_w \cong 10^6$) and 0.5 lb/bbl of maleic acid/vinyl acetate copolymer, the symbol ◑ is for 1.0 lb/bbl of hydroxyethyl cellulose ($\overline{M}_w=4\times 10^5$) and 2.0 lbs/bbl of polyethylene glycol, $\overline{M}_w=20,000$ (PEG 20M), the symbol ◐ is for 1.0 lb/bbl of hydroxyethyl cellulose ($\overline{M}_w=4\times 10^5$) and 2.0 lbs/bbl of ethylene oxide (75 percent)/propylene oxide copolymer, the symbol ● is for 2.0 lbs/bbl of hydroxyethyl cellulose ($\overline{M}_w=4\times 10^5$) and 2.0 lbs/bbl of ethylene oxide (75%) EOPOC, and the symbol ○ is for 1 lb/bbl of maleic acid/vinyl acetate copolymer. In FIG. 6, the symbol ■ is for 28.8 lbs/bbl of bentonite, unmodified, and the symbol ⊕ is for 2.0 lbs/bbl of UCON ®1400 [an ethylene oxide/propylene oxide copolymer].

The unique ability of ethylene oxide derivatives to synergistically affect the rheological profiles of hydroxyethyl cellulose-beneficiated bentonite slurries is shown by FIG. 6. The hydroxyethyl cellulose slurry containing an intermediate, high molecular weight ($\overline{M}_w=20,000$) polyethylene glycol is superior (DVI=3.0 at ambient conditions) to all fresh water slurries, including an hydroxyethyl cellulose-maleic acid/vinyl acetate copolymer blend or high total solids [28.8 lbs/bbl or 8.2 percent total solids (TS), DVI=1.83], unmodified bentonite slurry.

EXAMPLE 7

Figure 7:
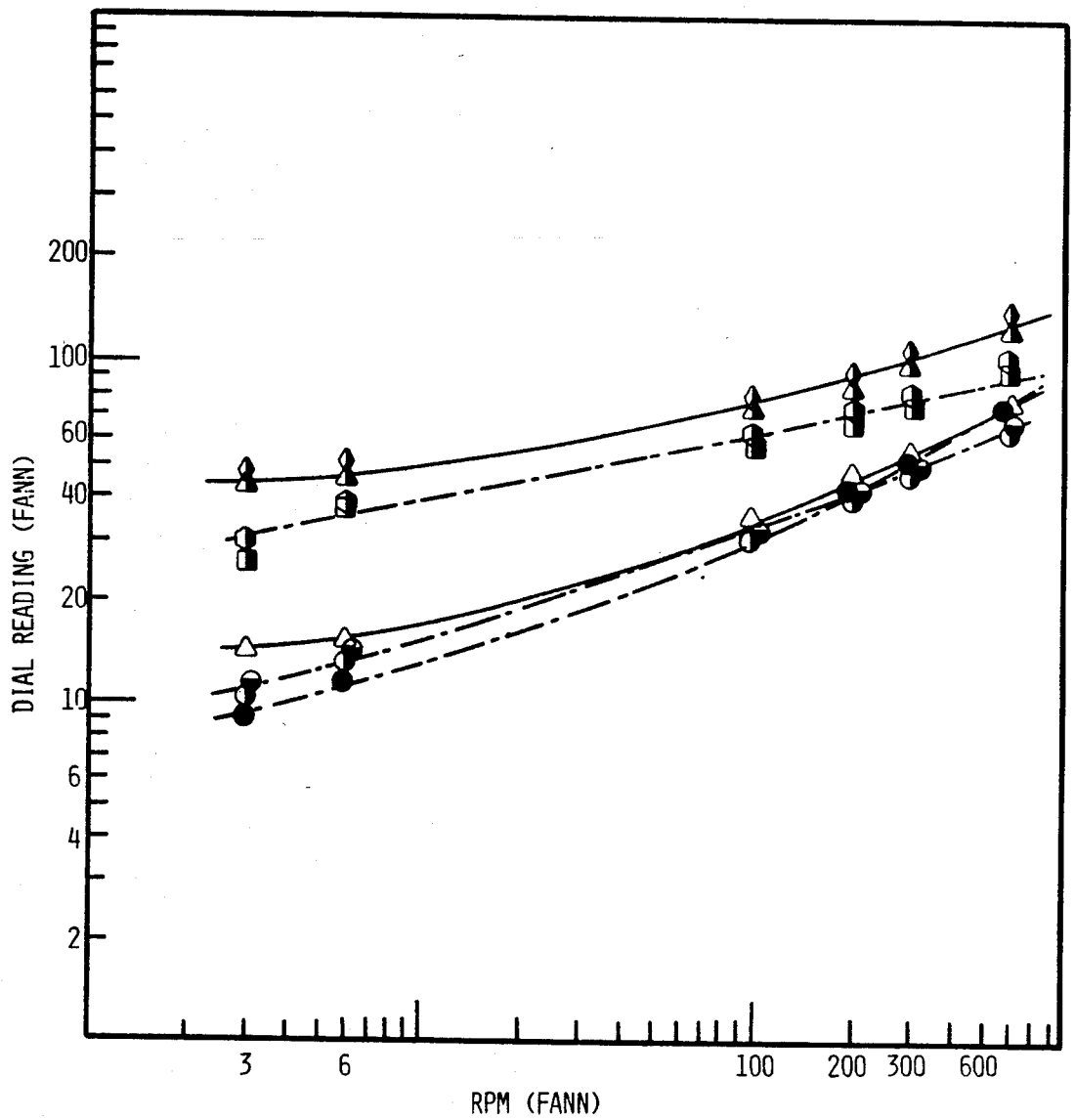
FIG. 7 is a graph of the rheological characteristics of various fresh water slurries of bentonite beneficiated with hydroxyethyl cellulose and polyethylene glycol.

Using the above-described procedure, the rheological characteristics of various fresh water slurries of 14.4 lbs/bbl bentonite beneficiated with hydroxyethyl cellulose ($\overline{M}_w=4\times 10^5$) and various amounts of polyethylene glycol were determined. The results are graphed in FIG. 7. In FIG. 7, concerning the beneficiation agents, the symbol ◆ is for 0.5 lb/bbl of hydroxyethyl cellulose and 0.5 lb/bbl polyethylene glycol ($\overline{M}_w=25,000$), the symbol ▲ is for 0.25 lb/bbl of hydroxyethyl cellulose and 0.5 lb/bbl of polyethylene glycol ($\overline{M}_w=25,000$), the symbol △ is for 0.25 lb/bbl of hydroxyethyl cellulose and 0.25 lb/bbl polyethylene glycol ($\overline{M}_w=25,000$), the symbol ◑ is for 0.5 lb/bbl of hydroxyethyl cellulose and 0.5 lb/bbl of polyethylene glycol ($\overline{M}_w=6,000$), the symbol ❑ is for 0.5 lb/bbl of hydroxyethyl cellulose and 0.25 lb/bbl of polyethylene glycol ($\overline{M}_w=6,000$), the symbol ◓ is for 0.25 lb/bbl of hydroxyethyl cellulose and 0.50 lb/bbl of polyethylene glycol ($\overline{M}_w=6,000$), the symbol ◑ is for 0.25 lb/bbl of hydroxyethyl cellulose and 0.75 lb/bbl polyethylene glycol ($\overline{M}_w=6,000$), and the symbol ● is for 0.25 lb/bbl of hydroxyethyl cellulose and 1.0 lb/bbl polyethylene glycol ($\overline{M}_w=6000$).

The synergy and influence of component ratios and molecular weights on the rheological profile of lower concentration (i.e., lower cost) hydroxyethyl cellulose-polyethylene glycol beneficiated slurries are illustrated in FIG. 7. At ambient temperatures the higher molecular weight polyethylene glycol with hydroxyethyl cellulose exhibited yield stress characteristics. As shown by FIG. 2, and as is shown below in saline solutions, bentonite slurries are prone to demonstrate yield character with increasing temperature, so all of the systems illustrated in FIG. 7 are viable drilling fluids.

EXAMPLE 8

Figure 8:
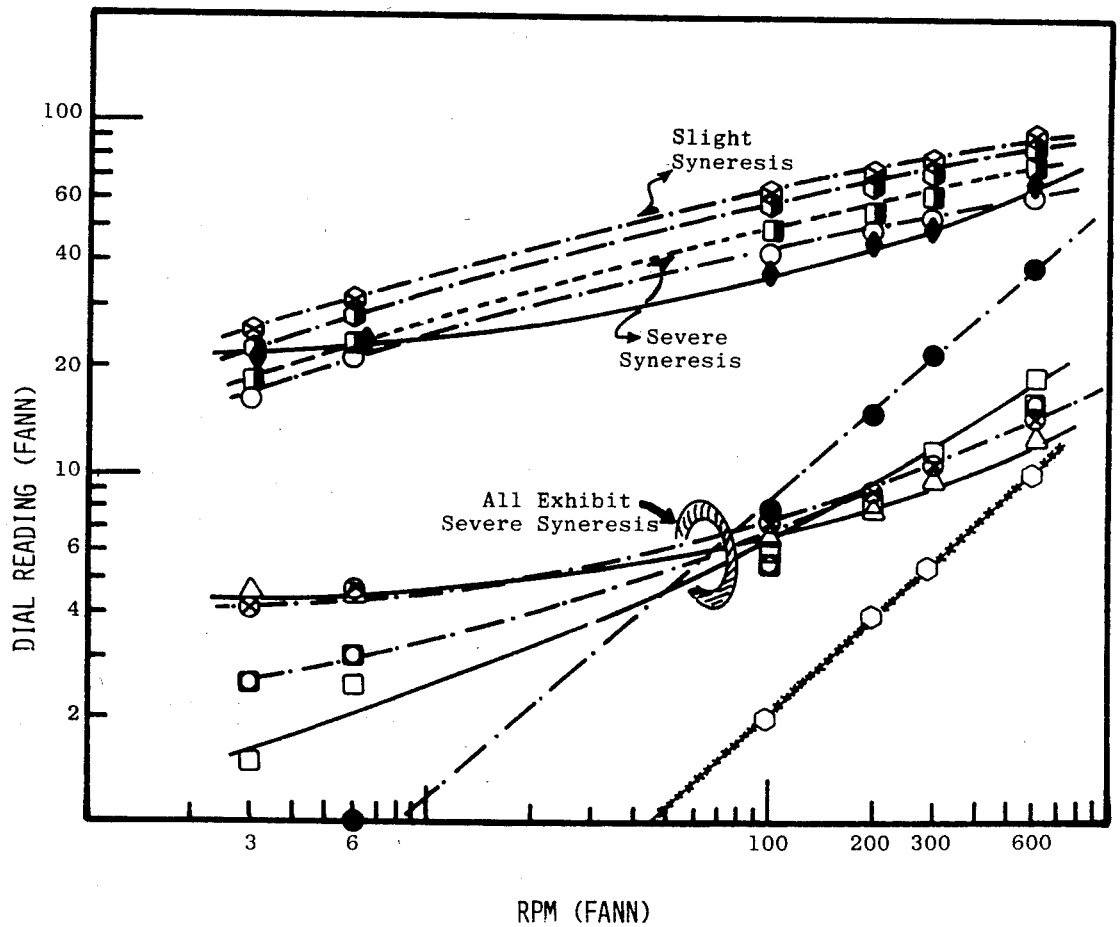
FIG. 8 is a graph of the rheological characteristics of various saline aqueous slurries of beneficiated bentonite.

Using the above-described procedure, the rheological characteristics of various saline (5.5 wt. percent) aqueous slurries of 14.4 lbs/bbl bentonite beneficiated with various beneficiating agents were determined. The results are graphed in FIG. 8. In FIG. 8, concerning the beneficiation agents, the symbol ⊗ is for 1 lb/bbl of hydroxyethyl cellulose ($\overline{M}_w = 4 \times 10^5$), the symbol ■ is for 1 lb/bbl of Xanthomonas campetris polysaccharide, the symbol □ is for 1 lb/bbl of maleic acid/vinyl acetate copolymer, the symbol ⊗ is for 1 lb/bbl of polyethylene glycol ($\overline{M}_w = 6,000$), the symbol ◗ is for 0.5 lb/bbl of hydroxyethyl cellulose ($\overline{M}_w = 4 \times 10^5$) and 0.5 lb/bbl of polyethylene glycol ($\overline{M}_w = 20,000$), the symbol ○ is for 0.25 lb/bbl of hydroxyethyl cellulose ($\overline{M}_w = 4 \times 10^5$) and of 0.25 lb/bbl polyethylene glycol ($\overline{M}_w = 20,000$), the symbol ◧ is for 0.50 lb/bbl of hydroxyethyl cellulose ($\overline{M}_w = 4 \times 10^5$) and 0.5 lb/bbl of maleic acid/vinyl acetate copolymer, the symbol ◉ is for 0.5 lb/bbl of polyethylene glycol ($\overline{M}_w = 6,000$) and 0.5 lb/bbl of maleic acid/vinyl acetate copolymer, the symbol ● is for 1.0 lb/bbl of hydroxyethyl celulose ($\overline{M}_w = 4 \times 10^5$) and 2.0 lbs/bbl of polyethylene glycol ($\overline{M}_w = 20,000$), the symbol △ is for a bentonite slurry, unmodified, and the symbol ◯ is for an aqueous solution thickened only with 1 lb/bbl of hydroxyethyl cellulose ($\overline{M}_w = 4 \times 10^5$).

Salinity, particularly divalent ions, induced a marked syneresis (i.e., phase separation—into concentrated bentonite and clear aqueous phases) in bentonite slurries, unmodified or beneficiated with a maleic acid/vinyl acetate copolymer. Salinity (alone) markedly improved the rheological profile of hydroxyethyl cellulose-beneficiated slurries, but even hydroxyethyl cellulose, which is saline compatible, did not protect the bentonite slurry from some syneresis. The use of hydroxyethyl cellulose-polyethylene glycol blends in moderate concentrations inhibited syneresis. This is in contrast to hydroxyethyl cellulose-maleic acid/vinyl acetate copolymer blend beneficiated slurries which exhibited severe syneresis within 24 hours. The influence of polyethylene glycol molecular weight on rheological profiles was not evident in saline solutions. Surprisingly, hydroxyethyl cellulose-polyethylene glycol blends in high concentration, which affected excellent rheological profiles (see FIG. 5) in fresh water slurries, did not provide superior bentonite slurries in saline (5.5 wt. percent, see FIG. 8 and Table II) solutions and did not inhibit syneresis. The influence of hydroxyethyl cellulose-polyethylene glycol compositional and molecular weight changes upon bentonite in both fresh and saline solutions are summerized in terms of the Dimensionless Viscosity Index and 10 second gel strength (Standard API test) in Table II below.

TABLE II

| DIMENSIONLESS VISCOSITY INDEX AND GEL STRENGTH (10 SECOND) OF HYDROXYETHYL CELLULOSE - POLYETHYLENE GLYCOL BENEFICIATED BENTONITE (14.4 LBS/BBL) SLURRIES | | | | | | | |
|---|---|---|---|---|---|---|---|
| CELLOSIZE ® HYDROXYETHYL CELLULOSE | | CARBOWAX | | FRESH WATER SLURRIES | | SALINE (5.5 WT. %[a] SLURRIES | |
| GRADE | CONC., LLB/BBL | GRADE | CONC. | DVI[b] | 10' GEL STR.[c] | DVI[b] | 10' GEL STR.[c] |
| QP4400H | 0.25 | 20M[d] | 0.25 | 1.88 | 9 | 1.64 | 17 |
| | 0.25 | 20M | 0.50 | 1.80 | 37 | 1.60 | 15 |
| | 0.25 | 6M | 0.50 | 1.37 | 11 | 1.56 | 20 |
| | 0.25 | 6M | 0.75 | 1.37 | 11 | 1.55 | 8 |
| | 0.25 | 6M | 1.0 | 1.53 | 9 | — | — |
| | 0.50 | 6M | 0.25 | — | — | 1.60 | 24 |
| | 0.50 | 6M | 0.50 | 1.34 | 30 | 1.52 | 17 |
| | 0.50 | 20M | 0.50 | 1.82 | 63 | 1.60 | 20 |
| | 0.50 | 6M | 1.00 | 1.51 | 28 | 1.50[e] | 13 |
| | 1.00 | 6M | 2.00 | 1.75 | 32 | S.S.[f] | — |
| | 1.00 | 20M | 2.00 | 3.17 | 41 | S.S.[f] | — |
| QP-100M | 1.00 | 20M | 2.00 | 3.03 | 44 | S.S.[f] | — |
| QP-100M | 1.00 | — | — | 1.55 | 84 | — | — |
| QP-4400H | 1.00 | — | — | 1.35 | 70 | — | — |
| | 0.50 | — | — | — | — | 1.55 | 23 |
| | 0.50 | 6M | 0.5 | 1.48 | 0 | 1.37 | 0 |
| 14.4 LLB/BBL BENTONITE, UNMODIFIED | | | | 1.34 | 0 | S.S.[f] | — |

Notes:
[a]5.0 wt. percent of NaCl 0.5 wt. percent of CaCl$_2$
[b]Defined in Table I, 72° C. measurements
[c]Standard API Test on Fann Viscometer, 72° F.
[d]A hydropholic coupled analog of lower molecular weight polyethylene glycols
[e]Slight amount of syneresis observed
[f]Severe syneresis observed

EXAMPLE 9

Figure 9:
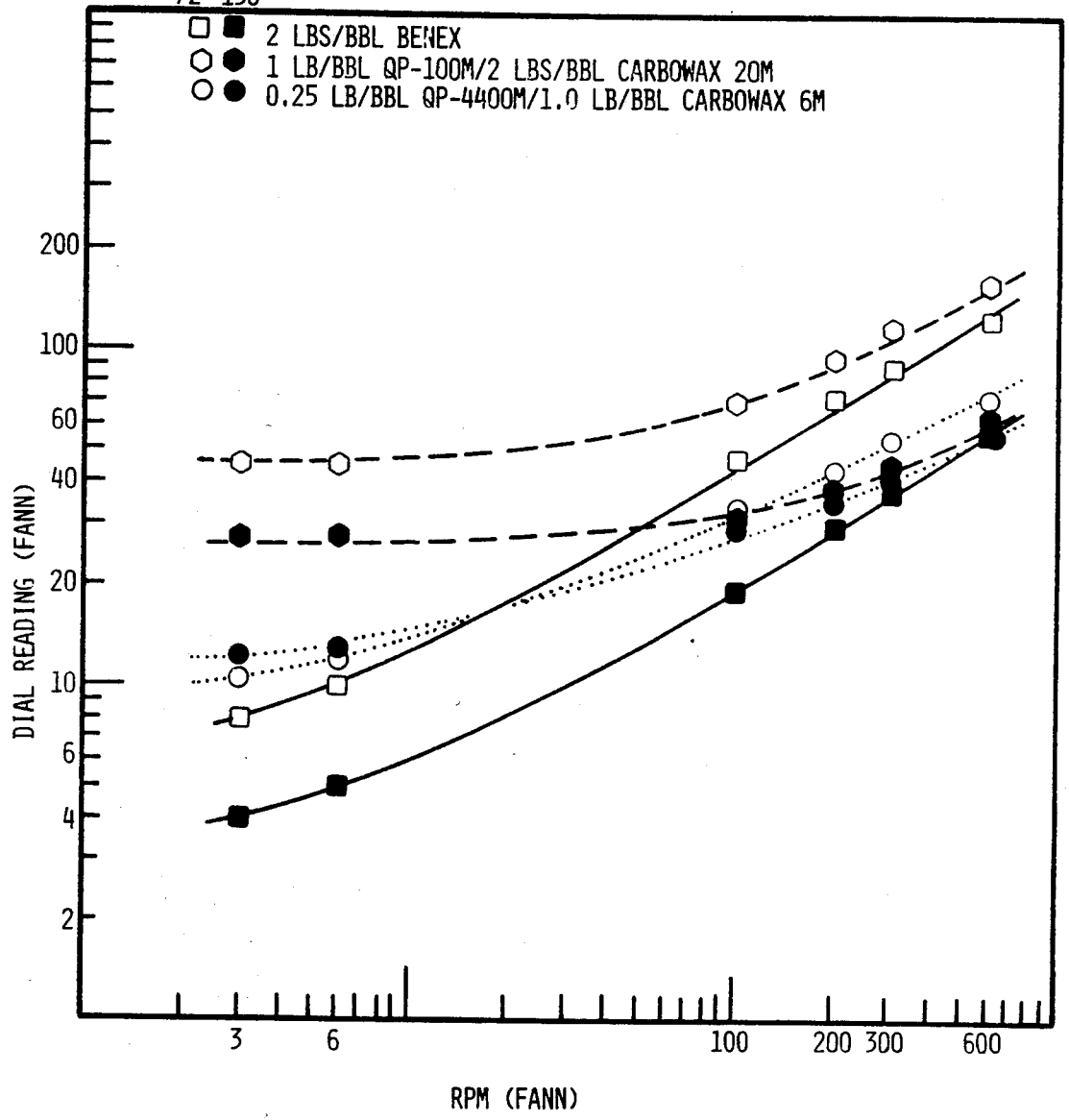
FIG. 9 is a graph of the rheological characteristics as a function of temperature of various fresh water slurries of beneficiated bentonite.

Using the above-described procedure, the rheological characteristics as a function of temperature of various fresh water slurries of 14.4 lbs/bbl bentonite beneficiated with various amounts of beneficiating agents. The results are graphed in FIG. 9. In FIG. 9, concerning the beneficiation agents, the symbols □ and ■ are for 2 lbs/bbl of maleic acid/vinyl acetate copolymer, the symbols ○ and ● are for 1 lb/bbl of hydroxyethyl cellulose ($\overline{M}_w = 10^6$) and 2 lbs/bbl of polyethylene glycol ($\overline{M}_w = 20,000$) and the symbols ○ and ● are for 0.25 lb/bbl of hydroxyethyl cellulose ($\overline{M}_w = 4 \times 10^5$) and 1.0 lb/bbl of polyethylene glycol ($\overline{M}_w = 6,000$). The open symbols represent measurements at 72° F. and the closed symbols are for data taken at 150° F.

Figure 10:
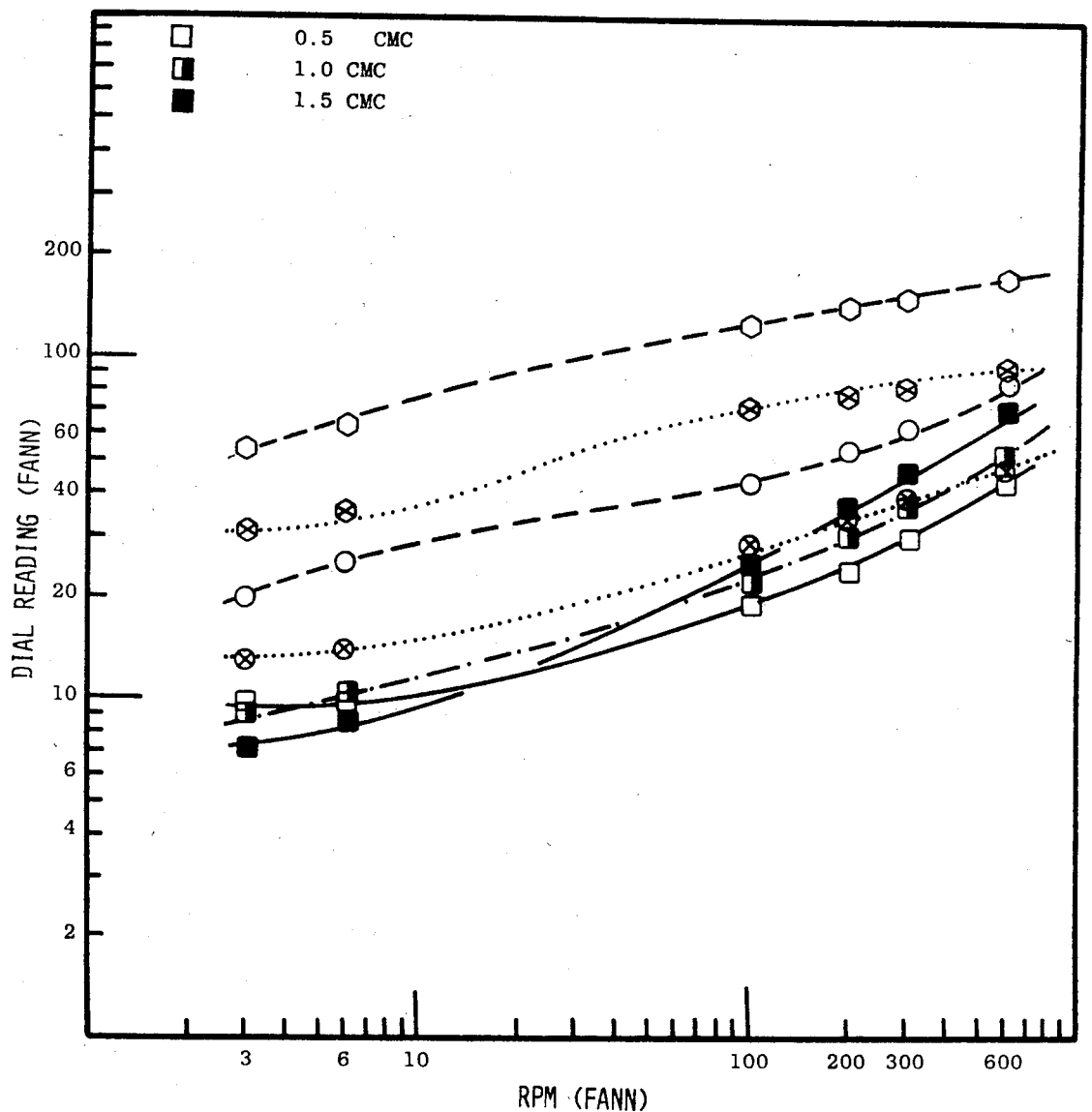
FIG. 10 is a graph of the rheological characteristics of various saline aqueous slurries of beneficiated bentonite.

The influence of temperature on the rheological behaviour of beneficiated slurries is shown in FIG. 9 (fresh water) and FIG. 10 (saline solutions). The fresh water slurry containing the maleic acid/vinyl acetate copolymer decreased in viscosity with no significant improvement in rheological characteristic, whereas the high concentration hydroxyethyl cellulose-polyethylene glycol bentonite mixture approached a near ideal profile (DVI=3.5) at 150° F. In a low hydroxyethyl cellulose-polyethylene glycol concentration beneficiated slurry, the profile change was only moderate but the low rpm viscosity increased with temperature. This is an advantageous feature in drilling fluids. Within the wellbore, yield stress characteristics are desirable to increase the solids carrying capacity of the fluid. A lower absolute viscosity with the disappearance of real yield stress behavior at ambient (surface) temperatures is desirable for easy removal of drilled solids on the shale shaker.

EXAMPLE 10

Using the above-described procedure, the rheological characteristics of various saline (5.5 wt. percent) aqueous slurries of 14.4 lbs/bbl bentonite beneficiated with various beneficiating agents at various amounts were determined. The results are graphed in FIG. 10. In FIG. 10, concerning the beneficiation agents, the symbols ○ and ⊗ are for 0.125 lb/bbl carboxymethyl cellulose (degree of substitution=0.9, CMC), 0.5 lb/bbl of hydroxyethyl cellulose ($\overline{M}_w = 4 \times 10^5$), and 0.5 lb/bbl of polyethylene glycol ($\overline{M}_w = 6,000$), the symbols ○ and ⊗ are for 0.5 lb/bbl of carboxymethyl cellulose, 0.5 lb/bbl of hydroxyethyl cellulose ($\overline{M}_w = 4 \times 10^5$), 2.0 lbs/bbl of polyethylene glycol ($\overline{M}_w = 6,000$), the symbol ⌐ is for 0.5 lb/bbl of carboxymethyl cellulose, the symbol ◨ is for 1 lb/bbl of carboxymethyl cellulose and the symbol ■ is for 1.5 lb/bbl of carboxymethyl cellulose.

In saline solutions, carboxymethyl cellulose (CMC, D.S.=0.9) is often used to modify bentonite properties. Increasing the concentration of carboxymethyl cellulose (0.5→1.0→1.5 lbs/bbl) did not result in slurry viscosity increases (see FIG. 10), as it did in fresh water slurries, for reasons probably related to the salinity sensitivity of the water-soluble polymers. Ternary blends with hydroxyethyl cellulose, polyethylene glycol and carboxymethyl cellulose as the beneficiating agents resulted in viscosity increases, and such blends possessed yield stress characteristics (see FIG. 10) at an intermediate wellbore temperature (150° F.). The sigmoidal behavior noted with one of the formulations in FIG. 10 was observed in several slurries with hydroxyethyl cellulose, polyethylene glycol and carboxymethyl cellulose.

EXAMPLE 11

Figure 11:
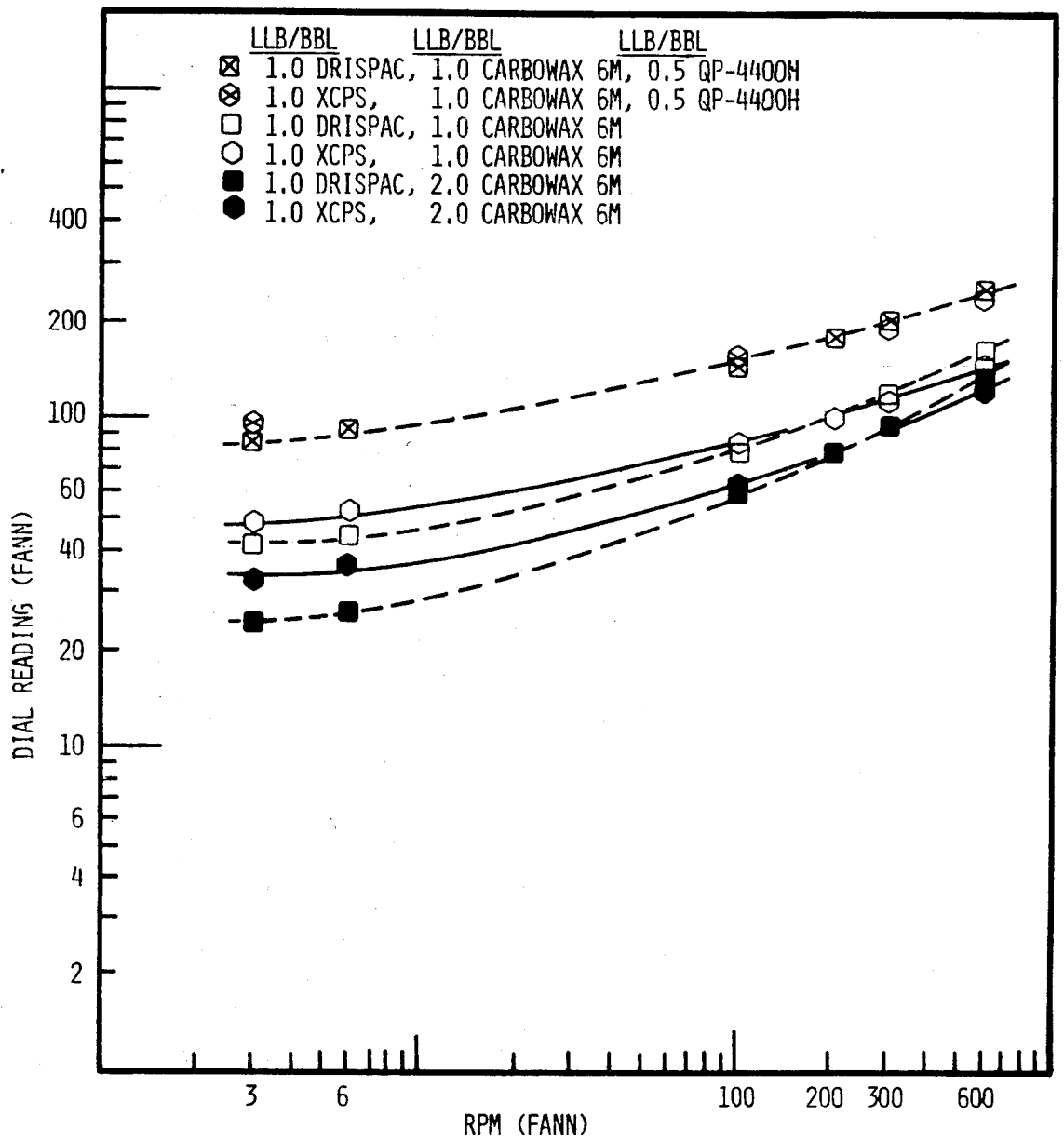
FIG. 11 is a graph of the rheological characteristics of various saline aqueous slurries of beneficiated bentonite.

Using the above-described procedure, the rheological characteristics of various saline (5.5 wt. percent) aqueous slurries of 14.4 lbs/bbl of bentonite beneficiated with various beneficiating agents. The results are graphed in FIG. 11. In FIG. 11, concerning the beneficiating agents, the symbol ⊠ is for 1.0 lb/bbl of carboxymethyl cellulose, 1.0 lb/bbl of polyethylene glycol ($\overline{M}_w = 6,000$), and 0.5 lb/bbl of hydroxyethyl cellulose ($M_w = 4 \times 10^5$), the symbol ⊗ is for 1.0 lb/bbl of Xanthomonas campestris polysaccharide (XCPS), 1.0 lb/bbl of polyethylene glycol ($\overline{M}_w = 6,000$) and 0.5 lb/bbl of hydroxyethyl cellulose ($\overline{M}_w = 4 \times 10^5$), the symbol □ is for 1.0 lb/bbl of carboxymethyl cellulose, and 1.0 lb/bbl of polyethylene glycol ($\overline{M}_w = 6,000$), the symbol ○ is for 1.0 lb/bbl of XCPS and 1.0 lb/bbl of polyethylene glycol ($\overline{M}_w = 6,000$), the symbol ■ is for 1.0 lb/bbl of carboxymethyl cellulose, and 2.0 lbs/bbl of polyethylene glycol ($\overline{M}_w = 6,000$) and the symbol ● is for 1.0 lb/bbl of XCPS and 2.0 lbs/bbl of polyethylene glycol ($\overline{M}_w = 6,000$).

Several other compositional hydroxyethyl glycol-polyethylene glycol blends with another anionic polysaccharide (XCPS) are shown in FIG. 11. Polyethylene glycol, highly interactive with divalent ions, was effective to a certain concentration in increasing the viscosity of anionic polysaccharides beneficiated slurries, but appeared to act as a dispersant at higher concentrations and the slurry viscosity dropped unless HEC was added. The fluid loss characteristics of these and representative fresh water modified bentonite slurries are listed in Table III below. The accepted industry standard is less than 20 cc in the API thirty minute test.

TABLE III

FLUID LOSS[a] IN BENEFICIATED 14.4 LBS/BBL BENTONITE DRILLING FLUIDS

| BENEFICIATING AGENT | | FLUID LOSS[a], cc | |
|---|---|---|---|
| TYPE | CONC. lBS/BBL | FRESH WATER SLURRIES | 5.5 Wt. %[b] SALINE SLURRIES |
| Control | | 15 | 67 |
| XCPS[c] | 0.5 | 8 | — |
| | 1.0 | — | 11 |
| MAVAC[d] | 2.0 | 5 | 142 |
| CMC[e] | 1.0 | — | 12 |
| HEC[f] | 0.5 | — | 101 |
| | 1.0 | 18 | — |
| HEC, MAVAC | 0.25, 0.25 | 12 | — |
| HEC, | 0.25, 1.0 | 16 | — |
| PEG 6M[g] | 2.0, 0.5 | — | 15 |
| HEC[h], PEG 20M[g] | 0.5, 0.5 | 16 | — |
| | 1.0, 2.0 | 14 | — |
| HEC, PEG 6M, CMC | 0.5, 1.0, 1.0 —, 1.0, 1.0 | — | 14 11 |
| HEC, PEG 6M, XCPS | 0.5, 1.0, 1.0 —, 1.0, 1.0 | — | 17 11 |

Notes:
[a] Standard API test, ≦20 minutes acceptable
[b] 5.0 wt. percent of NaCl, 0.5 wt. percent of CaCl$_2$
[c] Xanthomonas campestris polysaccharide
[d] Maleic acid/vinyl acetate copolymer
[e] Carboxymethyl cellulose
[f] Hydroxyethyl cellulose, $\overline{M}_w = 4 \times 10^5$
[g] Polyethylene glycol, $\overline{M}_w = 6 \times 10^3$ (6M) or $2.5 \times 10^5$ (20M)
[h] HEC $\overline{M}_w = 10^6$

EXAMPLE 12

Figure 12:
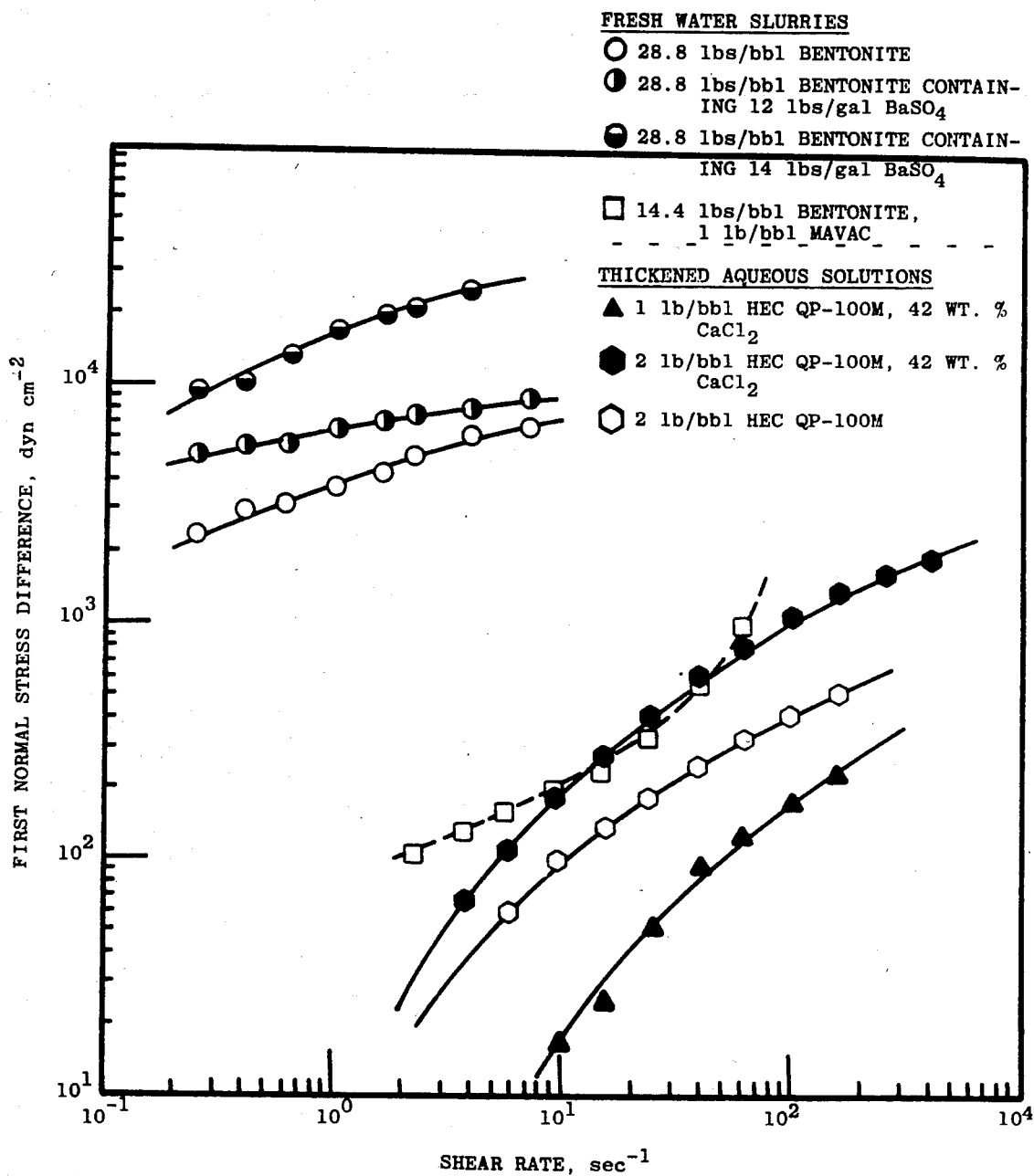
FIG. 12 is a graph of the viscoelastic characteristics of various fresh water drilling fluid slurries and solutions.

Using the above-described procedure, the viscoelastic characteristics of various fresh water drilling fluid slurries and solutions were determined. The results are graphed in FIG. 12. In FIG. 12, concerning the beneficiating agents, the symbol ○ is for 28.8 lbs/bbl of bentonite, the symbol ◐ is for 28.8 lbs/bbl of bentonite slurry containing 12 lbs/gal of barium sulfate, the symbol ◓ is for 28.8 lbs/bbl of bentonite containing 14 lbs/gal of barium sulfate, the symbol □ is for 14.4 lbs/bbl of bentonite modified with 1 lb/bbl of maleic acid/vinyl acetate copolymer. In FIG. 12, concerning the hydroxyethyl cellulose thickened aqueous solutions, ○ is the symbol for such solution containing 2 lbs/bbl of hydroxyethyl cellulose ($\overline{M}_w = 10^6$), ● is the symbol for such solution containing 2 lbs/bbl of hydroxyethyl cellulose ($\overline{M}_w = 10^6$) and 42 wt. percent of calcium chloride, and ▲ is the symbol for such solution containing 1 lb/bbl of hydroxyethyl cellulose ($\overline{M}_w = 10^6$) and 42 wt. percent of calcium chloride.

Rheological tests more complex than can be investigated with the Fann viscometer were conducted—see Examples 12 to 14. It was envisaged that the weight of the drill string and bit would be counterbalanced by the formation pressure and that an "upward pressure" (i.e., that perpendicular to the plane of the rotating drill bit) of different drilling fluids would correlate inversely with their drillability. This "upward pressure", is referred to as a First Normal Stress Difference (N$_1$) in rheology and can be measured on a Rheometrics Mechanical Spectrometer (RMS). To test this hypothesis unmodified, high concentration bentonite slurries alone and weighted with barium sulfate (Barite) were evaluated alongside calcium chloride weighted, hydroxyethyl cellulose thickened clear fluids of equal viscosity.

The latter fluids are the accepted completion-mud industry standards. Unweighted, maleic acid/vinyl acetate copolymer beneficiated slurries were also examined. The unmodified clay exhibited considerable elastic properties through interparticle interactions and thus had a high $N_1$ characteristic (see FIG. 12). As shown in FIG. 12, the thickened hydroxyethyl cellulose-high salt (about 42 percent total solids) fluids and maleic acid/vinyl acetate copolymer beneficiated slurries, both known to be more drillable (i.e., faster rates) than the bentonite muds, had lower First Normal Stress Differences than the latter, conventional drilling fluids.

EXAMPLE 13

Figure 13:
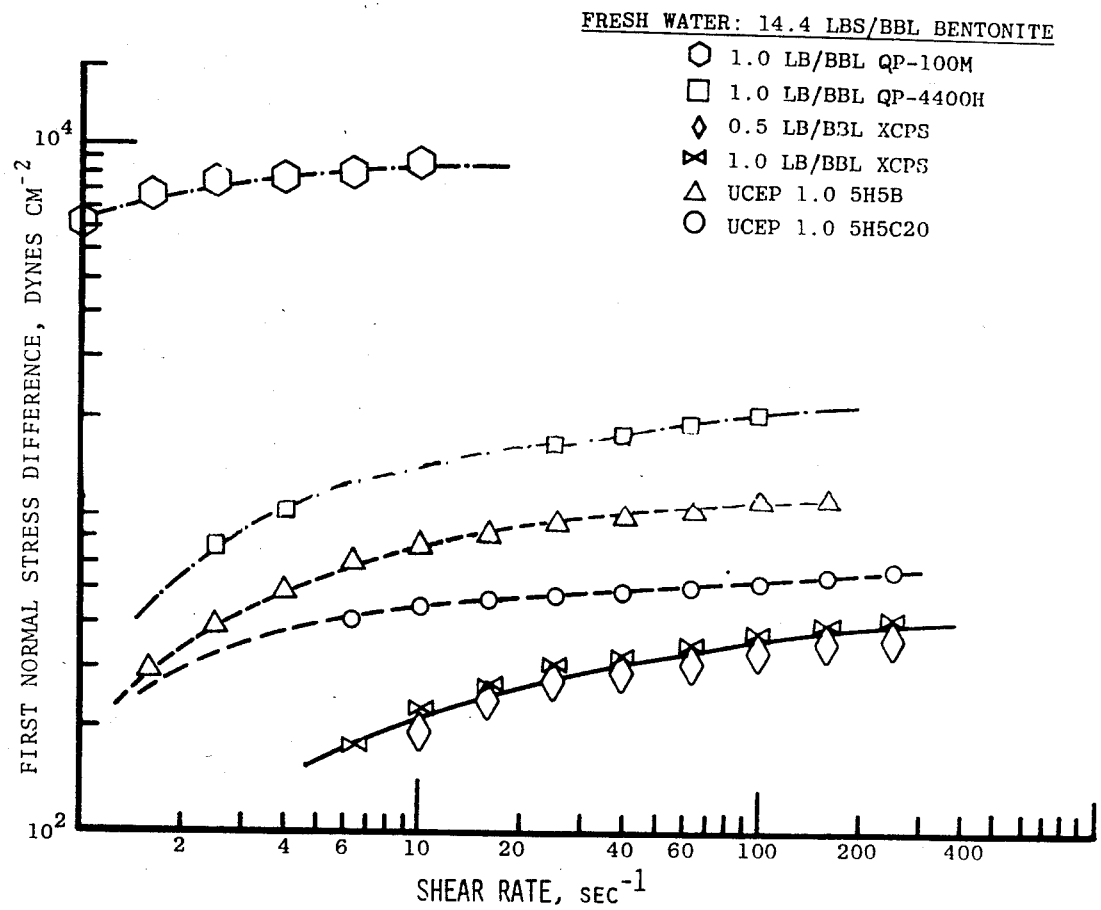
FIG. 13 is a graph of the viscoelastic characteristics of various water slurries of beneficiated bentonite.

Using the above-described procedure, the viscoelastic characteristics of various fresh water slurries of 14.4 lbs/bbl bentonite beneficiated with various beneficiating agents. The results are graphed in FIG. 13. In FIG. 13, concerning the beneficiating agents, the symbol ○ is for 1 lb/bbl of hydroxyethyl cellulose ($\overline{M}_w = 10^6$), the symbol □ is for 1 lb/bbl of hydroxyethyl cellulose ($\overline{M}_w = 4 \times 10^5$), the symbol ◇ is for 0.5 lb/bbl of Xanthomonas campestris polysaccharide, the symbol ▷◁ is for 1.0 lb/bbl of Xanthomonas campestris polysaccharide, the symbol △ is for 0.5 lb/bbl of hydroxyethyl cellulose ($\overline{M}_w = 4 \times 10^5$), and 0.5 lb/bbl of maleic acid/vinyl acetate copolymer, and the symbol ○ is for 0.5 lb/bbl of hydroxyethyl cellulose ($\overline{M}_w = 4 \times 10^5$) and 0.5 lb/bbl of polyethylene glycol ($\overline{M}_w = 20,000$).

Using the criterion set out in Example 12, several fresh water beneficiated slurries were examined on the Rheometrics Mechanical Spectrometer for Normal Stress Differences ($N_1$) (see FIG. 13). This rheological parameter is known to be very dependent on polymer molecular weight. Thus, the higher $N_1$ for $10^6 \overline{M}_w$ HEC (vs the $4 \times 10^5 \overline{M}_w$ HEC) bentonite slurry was not surprising, but the relative magnitude of the difference based upon non-clay systems was unexpected. The use of blends in the beneficiation lowered the $N_1$ values and the hydroxyethyl cellulose-polyethylene glycol blend approached the drillability of Xanthomonas compestris polysaccharide beneficiated bentonite, which might have been expected to exhibit large $N_1$ values because of the high molecular weight ($>10^6$) of Xanthomonas campestris polysaccharide. The latter result was probably a function of the unique interaction of Xanthomonas campestris polysaccharide with bentonite clay particles, which the polymer exhibited unfortunately with all drill solids.

EXAMPLE 14

Figure 14:
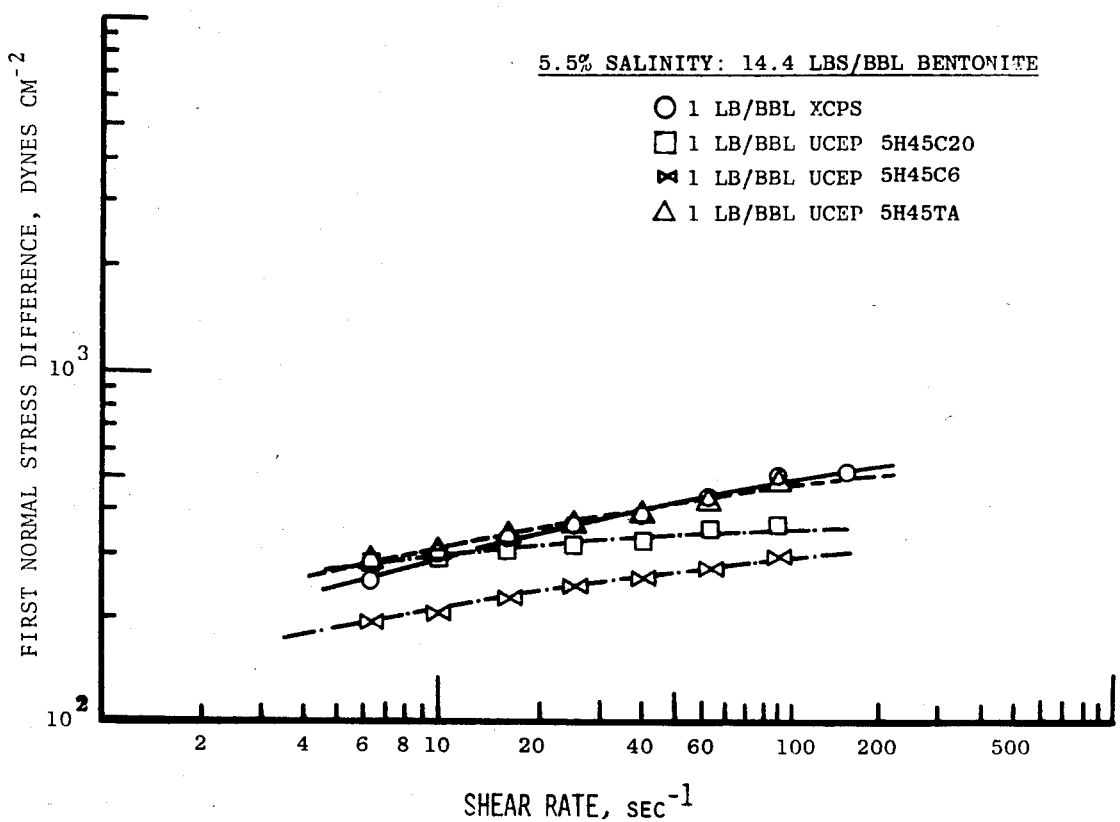
FIG. 14 is a graph of the viscoelastic characteristics of various saline aqueous slurries of beneficiated bentonite.

Using the above-described procedure, the viscoelastic characteristics of various saline (5.5 wt. percent) aqueous slurried of 14.4 lbs/bbl of bentonite beneficiated with various beneficiating agents. The results are graphed in FIG. 14. In FIG. 14, concerning the beneficiating agents, the symbol ○ is for 1 lb/bbl of Xanthomonas campestris polysaccharide, the symbol □ is for 0.5 lb/bbl of hydroxyethyl cellulose ($\overline{M}_w = 4 \times 10^5$), and 0.5 lb/bbl of polyethylene glycol ($\overline{M}_w = 20,000$), the symbol ⋈ is for 0.5 lb/bbl of hydroxyethyl cellulose ($\overline{M}_w = 4 \times 10^5$), and 0.5 lb/bbl of polyethylene glycol ($M_w = 6,000$), and the symbol △ is for 0.5 lb/bbl hydroxyethylcellulose, and 0.5 lb/bbl of triethanolamine.

In saline solutions the hydroxyethyl cellulose-polyethylene glycol blend beneficiated slurries have lower $N_1$ values (see FIG. 14) than the Xanthomonas campestris-bentonite mixture, probably in part related to the helix forming tendency of Xanthomonas campestris in saline solutions. Clearly the use of polyethylene glycol to control interparticle interactions (and thereby $N_1$ values) is a more economical method of achieving this goal with hydroxyethyl cellulose utilization for increasing the viscosity of the slurry and synergistically providing an ideal rheological profile and for maintenance of the integrity and removal of drilled solids.

What is claimed is:

1. A drilling fluid for use in the drilling of an oil well, gas well, geothermal well or the like, comprising:
    (a) bentonitic clay or sub-bentonitic clay;
    (b)
      (1) a nonionic, water-soluble polysaccharide selected from the group consisting of (i) a nonionic, water-soluble cellulosic derivative, (ii) a nonionic, water-soluble guar derivative; or
      (2) an anionic water-soluble polysaccharide selected from the group consisting of (i) a carboxymethyl cellulose or (ii) Xanthomonas campestris polysaccharide; or
      (3) a combination thereof;
    (c) an intermediate molecular weight polyglycol, selected from the group consisting of polyethylene glycol, polypropylene glycol, and poly-(alkanediol), having an average molecular weight of from about 600 to about 30,000, said polyglycol being used in an amount effective to provide compatibility in the drilling fluid between the clay and the polysaccharide; and
    (d) water, the drilling fluid being effective even in a highly saline environment.

2. The drilling fluid as claimed in claim 1 wherein the nonionic, water-soluble polysaccharide is a nonionic, water-soluble cellulosic derivative.

3. The drilling fluid as claimed in claim 2 wherein the nonionic, water-soluble cellulosic derivative is hydroxyethyl cellulose, hydroxypropyl cellulose, hydroxybutyl cellulose, hydroxyethylmethyl cellulose, hydroxypropyl methyl cellulose, methylhydroxypropyl cellulose, ethylhydroxyethyl cellulose, methylhydroxyethyl cellulose, hydroxybutylmethyl cellulose, hydroxyethyl methyl cellulose or methyl cellulose.

4. The drilling fluid as claimed in claim 2 wherein the nonionic, water-soluble polysaccharide contains hydroxyalkyl groups or alkylhydroxyalkyl groups or combinations thereof.

5. The drilling fluid as claimed in claim 4 wherein the hydroxyalkyl group contains 1 to 4 carbon atoms.

6. The drilling fluid as claimed in claim 1 wherein the nonionic, water-soluble polysaccharide is a nonionic, water-soluble guar derivative.

7. A drilling fluid for use in the drilling of an oil well, gas well, geothermal well or the like, comprising:
    (a) bentonitic clay or sub-bentonitic clay;
    (b) a water-soluble polysaccharide which is:
      (1) a nonionic, water-soluble polysaccharide which is a hydroxyethyl cellulose; or
      (2) an anionic, water-soluble polysaccharide which is (i) a carboxymethyl cellulose or (ii) Xanthomonas campestris polysaccharide; or
      (3) a combination thereof;
    (c) an intermediate molecular weight polyglycol, selected from the group consisting of polyethylene glycol, polypropylene glycol, and poly-(alkanediol), having an average molecular weight of from about 600 to about 30,000, said polyglycol being used in an amount effective to provide compatibility in the drilling fluid between the clay and the polysaccharide; and (d) water, the drilling being effective even in a highly saline environment.

8. The drilling fluid as claimed in claim 7 wherein the degree of polymerization of the nonionic, water-soluble cellulosic derivative is from about 3,500 to about 10,000.

9. The drilling fluid as claimed in claim 7 wherein the water-soluble polysaccharide is sodium carboxymethyl cellulose.

10. The drilling fluid as claimed in claim 8 wherein the sodium carboxymethyl cellulose has a degree of substitution of the hydroxyl groups of at least 0.4.

11. The drilling fluid as claimed in claim 7 wherein the water-soluble polysaccharide is Xanthomonas campestris polysaccharide.

12. The drilling fluid as claimed in claim 7 wherein the polyglycol is polyethylene glycol, polypropylene glycol (not more than 10 units), poly(1,3-propanediol), poly(1,2-butanediol), poly(1,4-butanediol) or poly(1,2-propanediol).

13. The drilling fluid as claimed in claim 12 wherein the polyglycol is straight chained.

14. The drilling fluid as claimed in claim 12 wherein the polyglycol is an intermediate molecular weight polyethylene glycol.

15. The drilling fluid as claimed in claim 12 wherein the polyethylene glycol is polyethylene glycol 600, polyethylene glycol 1000, polyethylene glycol 4000 or polyethylene glycol 6000.

16. The drilling fluid as claimed in claim 7 wherein the drilling fluid has a density of 10 to 30 pounds per barrel.

17. The drilling fluid as claimed in claim 7 wherein the drilling fluid contains about 5 to 7 weight percent of bentonitic clay.

18. The drilling fluid as claimed in claim 7 wherein a weighting material or a viscosifier or a lignosulfonate or an emulsifier or a combination thereof is incorporated.

19. The drilling fluid as claimed in claim 7 wherein a polyalkylene amine, a polyalkylene imine or an ethanolamine is also present.

20. The drilling fluid as claimed in claim 7 wherein the water-soluble polysaccharide is hydroxyethyl cellulose, the polyglycol is an intermediate molecular weight polyethylene glycol, and the clay is bentonite.

21. The drilling fluid as claimed in claim 20 wherein sodium carboxymethyl cellulose and at least one agent from the group consisting of a polyalkylene amine, a polyalkylene imine and an ethanolamine are also present.

22. Process for the preparation of the drilling fluid of claim 7 which comprises:
 (a) admixing the nonionic and/or anionic water-soluble polysaccharide with the water,
 (b) admixing the polyglycol with the admixture (a) and
 (c) mixing the bentonite with admixture (b) to form the drilling fluid.

23. A process of using the drilling fluid of claim 7 comprising circulating the drilling fluid through an oil, gas or geothermal well to assist in the drilling operation.

24. The process as claimed in claim 23 wherein the polysaccharide is a nonionic, water-soluble polysaccharide and the drilling is done in a non-saline environment.

25. The process as claimed in claim 7 wherein the water-soluble polysaccharide is hydroxyethyl cellulose and the polyglycol is an intermediate weight polyethylene glycol.

26. The process as claimed in claim 23 wherein the polysaccharide is an anionic, water-soluble polysaccharide and the drilling is done in a saline environment.

27. The process as claimed in claim 26 wherein the anionic, water-soluble polysaccharide is sodium carboxymethyl cellulose and the polyglycol is an intermediate weight polyethylene glycol.

28. The process as claimed in claim 27 wherein the drilling is done at an off-shore site.

* * * * *